(12) United States Patent
Dobson

(10) Patent No.: US 10,335,770 B2
(45) Date of Patent: Jul. 2, 2019

(54) METHOD AND SYSTEM FOR DIESEL OXIDATION CATALYSTS

(71) Applicant: Ford Global Technologies, LLC, Dearborn, MI (US)

(72) Inventor: Douglas Allen Dobson, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

(21) Appl. No.: 15/623,545

(22) Filed: Jun. 15, 2017

(65) Prior Publication Data

US 2018/0361358 A1 Dec. 20, 2018

(51) Int. Cl.
*B01J 23/00* (2006.01)
*B01J 35/00* (2006.01)
*B01J 35/06* (2006.01)

(52) U.S. Cl.
CPC ............ *B01J 23/002* (2013.01); *B01J 23/00* (2013.01); *B01J 35/0006* (2013.01); *B01J 35/006* (2013.01); *B01J 35/0053* (2013.01); *B01J 35/065* (2013.01)

(58) Field of Classification Search
USPC .................. 60/274, 286, 297, 299, 300, 301
See application file for complete search history.

(56) References Cited

U.S. PATENT DOCUMENTS

| | | | |
|---|---|---|---|
| 7,754,171 B2 * | 7/2010 | Chen .................... | B01D 53/945 423/213.2 |
| 7,758,834 B2 | 7/2010 | Chen et al. | |
| 7,875,573 B2 | 1/2011 | Beutel et al. | |
| 8,168,125 B2 | 5/2012 | Choi | |
| 8,211,392 B2 | 7/2012 | Grubert et al. | |
| 8,246,923 B2 | 8/2012 | Southward et al. | |
| 8,252,258 B2 | 8/2012 | Müller-Stach et al. | |
| 8,491,860 B2 | 7/2013 | Lambert et al. | |
| 9,636,634 B2 * | 5/2017 | Chiffey .................... | B01J 23/66 |
| 9,987,626 B2 * | 6/2018 | Guo ....................... | B01J 35/0006 |
| 2008/0219906 A1 * | 9/2008 | Chen .................... | B01D 53/945 423/213.5 |

(Continued)

FOREIGN PATENT DOCUMENTS

| | | | | |
|---|---|---|---|---|
| GB | 2514266 | * | 11/2014 | ............. B01J 23/44 |
| WO | 2013042080 A1 | | 3/2013 | |

OTHER PUBLICATIONS

Lambert, C. et al., "Development of the 2011MY Ford Super Duty Diesel Catalyst System," Proceedings of the 2011 DEER Conference, Ford Research and Advanced Engineering, Oct. 4, 2011, Dearborn, Michigan, 31 pages.

(Continued)

*Primary Examiner* — Binh Q Tran
(74) *Attorney, Agent, or Firm* — Julia Voutyras; McCoy Russell LLP

(57) ABSTRACT

A layered emission control device for an engine system is provided, including a plurality of catalytic layers, the catalytic layers optionally or additionally comprising sublayers, each sublayer having a distinct composition. Advantages of such a device include providing increased treatment rates of one or more engine exhaust gas species over a wide range of engine exhaust operating conditions, while reducing exhaust emissions, and reducing a size of the emissions control system.

20 Claims, 10 Drawing Sheets

(56) References Cited

U.S. PATENT DOCUMENTS

2012/0023909 A1\* 2/2012 Lambert ............ B01D 53/9468
60/274
2015/0231566 A1 8/2015 Xu et al.
2016/0341091 A1 11/2016 Theis et al.

OTHER PUBLICATIONS

Zammit, M. et al., "Future Automotive Aftertreatment Solutions: the 150° C. Challenge Workshop Report," Proceedings of the 2012 USDRIVE Workshop, ACEC Low Temperature Aftertreatment Group, Nov. 29, 2012, Southfield, Michigan, 30 pages.
Dobson, D., "Methods and Systems for a Diesel Oxidation Catalyst," U.S. Appl. No. 15/466,721, filed Mar. 22, 2017, 54 pages.

\* cited by examiner

METHOD AND SYSTEM FOR DIESEL OXIDATION CATALYSTS

FIELD

The present application relates to methods and systems for emissions control of a vehicle with a layered diesel oxidation catalyst.

BACKGROUND AND SUMMARY

The search for a cost-effective and fuel efficient diesel aftertreatment solution is a significant challenge. Low-Emission Vehicle (LEV) tailpipe standards for diesel vehicles demand very low hydrocarbon (HC) and nitrogen oxide (NOx) standards for vehicles having 150,000 miles or more. Achieving and maintaining high efficiencies during EPA-mandated Federal Test Procedures (FTP) and Supplemental Federal Test Procedures (SFTP) may be difficult as typical operating conditions of on-road diesel vehicles readily degrade Pt NOx oxidation.

In attempts to meet the above-mentioned federal emissions regulations (among other standards and specifications) and reduce exhaust gas emissions, vehicle engines may be equipped with an emission control system comprising various emission control devices arranged in various configurations, such as three-way catalysts, diesel oxidation catalysts, particulate filters, NOx catalysts, and hydrocarbon traps.

One example configuration is shown by Choi in U.S. Pat. No. 8,168,125. Therein, a three-layer catalyst is located upstream of a selective catalytic reduction (SCR) device, and heat is provided by oxidizing hydrocarbons in order to release sulphur absorbed at an oxidation catalyst. Another example is shown by Chen et al. in U.S. Pat. 7,758,834. Therein, a three-way catalyst comprising only platinum group metals is supported on a cordierite support.

However, the inventors herein have identified potential issues with such systems related to stability of NOx oxidation over time under the typical operating conditions of on-road diesel vehicles. One potential issue may be that various functionalities of emissions control systems may compete and/or interfere with one another. For example, NO species may be oxidized to $NO_2$ by a diesel oxidation catalyst upstream of a NOx catalyst after an engine cold start. However, the hydrocarbon and carbon monoxide oxidizing function of the diesel oxidation catalyst may interfere with the NOx oxidation function of the catalyst. As a result, even with modified configurations, emissions compliance, especially NOx emissions compliance, may not be achieved. This issue may be exacerbated as emissions regulations get more stringent while combustion processes become more efficient with significantly lower exhaust temperatures. As another example, the different configurations and the lower exhaust temperatures may complicate emission control device (ECD) temperature control strategies. As a further example, due to packaging volume constraints on the vehicle, the space available for the different configurations and functionalities of the emission control system may be limited. Overall, many current diesel oxidation catalyst and layered catalyst design systems may effectively worsen exhaust emissions or not provide lasting and robust emissions control.

In one embodiment, some of the above issues may be at least partially addressed by a layered emission control device (ECD) coupled to an engine exhaust, comprising: a first layer including a first oxidizing catalyst; a second layer including a hydrocarbon trap upstream from a third layer; and the third layer, comprising inner sublayers, each of the inner sublayers comprising base metal oxide (BMO) catalysts and having a BMO catalyst composition distinct from the other inner sublayers, wherein exhaust gas is directed into and emitted from the layered ECD at an upstream side of the first layer and at a downstream side of the third layer, respectively.

In another embodiment, a layered emission control system, including a layered emission control device (ECD) fluidly coupled to an engine exhaust may comprise: a first oxidizing catalyst layer positioned at an upstream side of the layered ECD within which a first portion of the exhaust gas is oxidized; a second oxidizing catalyst layer arranged at a downstream side of the layered ECD within which a second portion of the exhaust gas is oxidized; and a hydrocarbon trapping layer arranged intermediate to upstream side and the downstream side, wherein the second oxidizing catalyst layer comprises a plurality of second sublayers, each of the second sublayers comprise base metal oxide (BMO) catalysts, each of the second sublayers having a BMO catalyst composition distinct from the other second sublayers, and the first portion of the exhaust gas comprises one or more of hydrocarbons, CO, and $SO_2$, and the second portion of the exhaust gas comprises NOx.

In a further embodiment, a method of treating exhaust gas from an engine, the engine including a layered emissions control device (ECD), may comprise: directing the exhaust gas at an inlet temperature to a first layer of the layered ECD positioned at an upstream side of the layered ECD, the first layer comprising a first oxidizing catalyst; oxidizing a first portion of the exhaust gas by the first oxidizing catalyst within the first layer; trapping a second portion of the exhaust gas within a second layer, the second layer including a hydrocarbon trapping material; directing the exhaust gas from the first and second layers to a third layer, the third layer including a plurality of inner sublayers, each of the sublayers comprising base metal oxide (BMO) catalysts and having a BMO catalyst composition distinct from the other inner sublayers; and oxidizing a third portion of the exhaust gas in the third layer, wherein the first portion comprises one or more of hydrocarbons, CO, and $SO_2$, the second portion comprises hydrocarbons, and the third portion comprises NOx. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementation that solve any disadvantages noted above or in any part of this disclosure.

DETAILED DESCRIPTION

Figure 1:
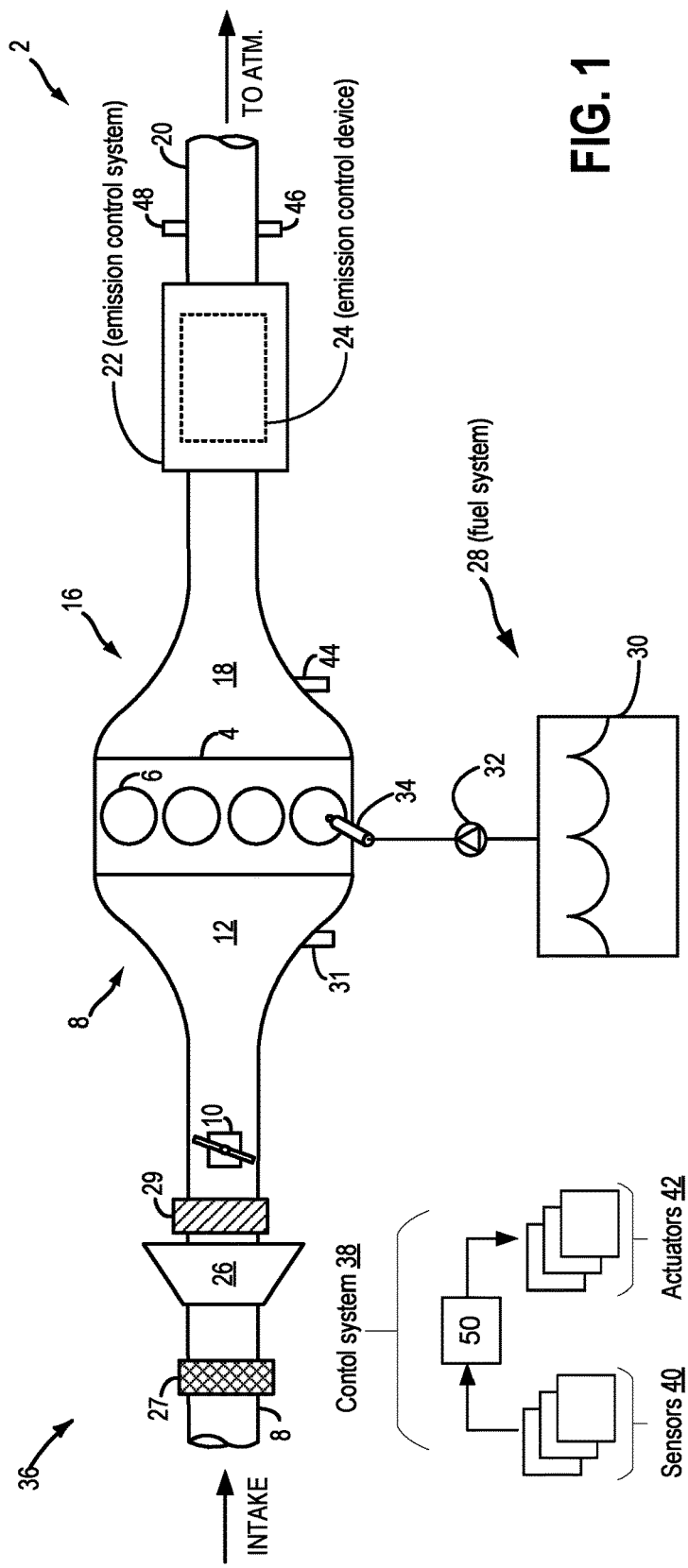
FIG. 1 shows a schematic depiction of an engine system.
Figure 2A:
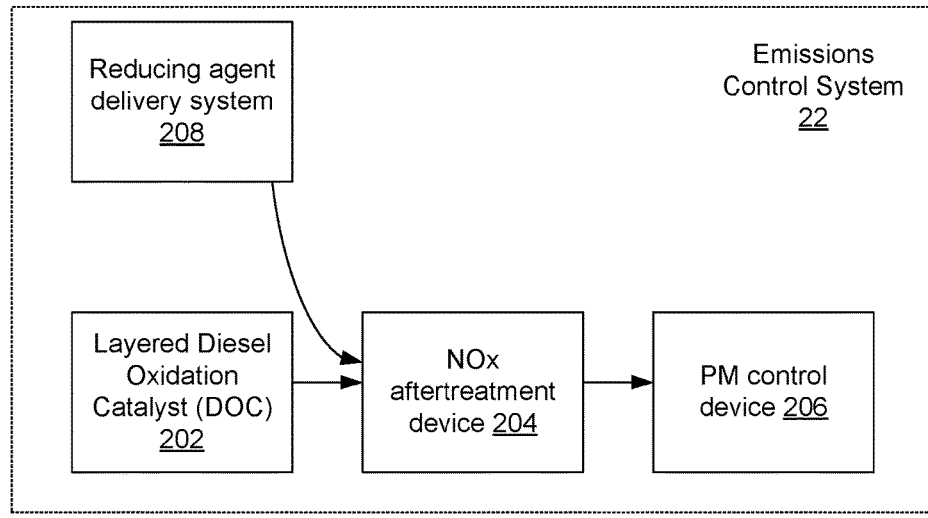
FIGS. 2A and 2B show schematic depictions of the emission control system coupled to the engine system of FIG. 1, including layered emission control devices.
Figure 2B:
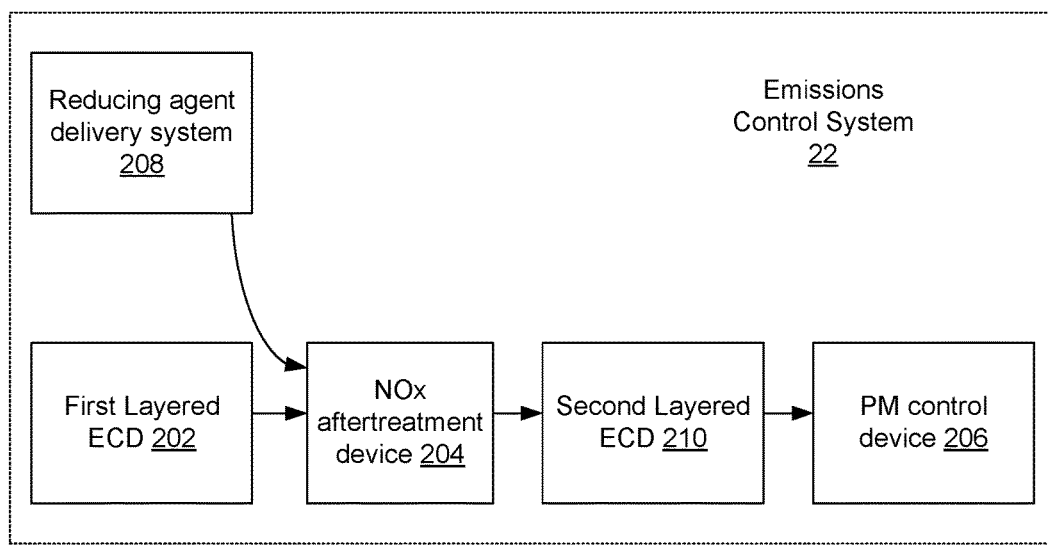

The following description relates to systems and methods for a layered emission control device (ECD) coupled to the exhaust manifold of an engine system, such as the engine system of FIG. 1. The layered emission control device may be a layered diesel oxidation catalyst (DOC) system, as depicted in FIGS. 2A and 2B, positioned upstream of one or more other emission control devices, such as one or more NOx reducing catalysts, particulate matter (PM) filters and an exhaust gas recirculation (EGR) system coupled to the engine exhaust manifold. The layers of the layered emission control device may include different layer compositions and arrangements of the layers therein for reducing exhaust emissions while maintaining or reducing a size of the emissions control system. Different configurations and formulations of DOC layers may be implemented based upon further downstream emissions control devices, specifically the DOC layers may be configured to enable certain functional synergies between successive emissions control devices and reduce operating interferences.

Figure 5:
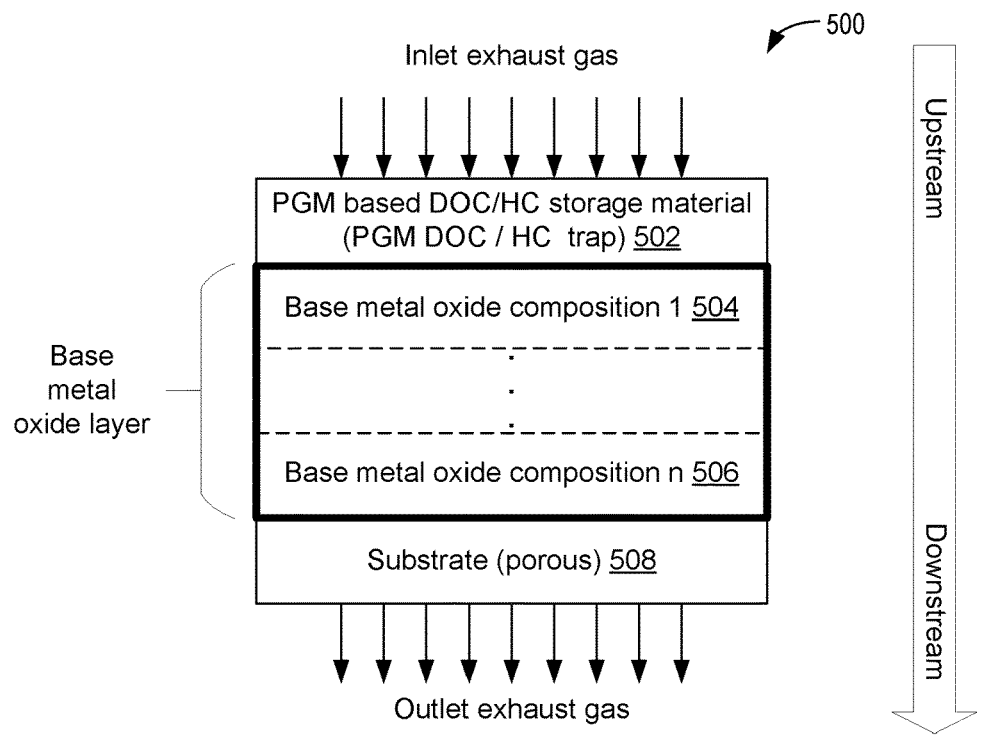
Figure 6:
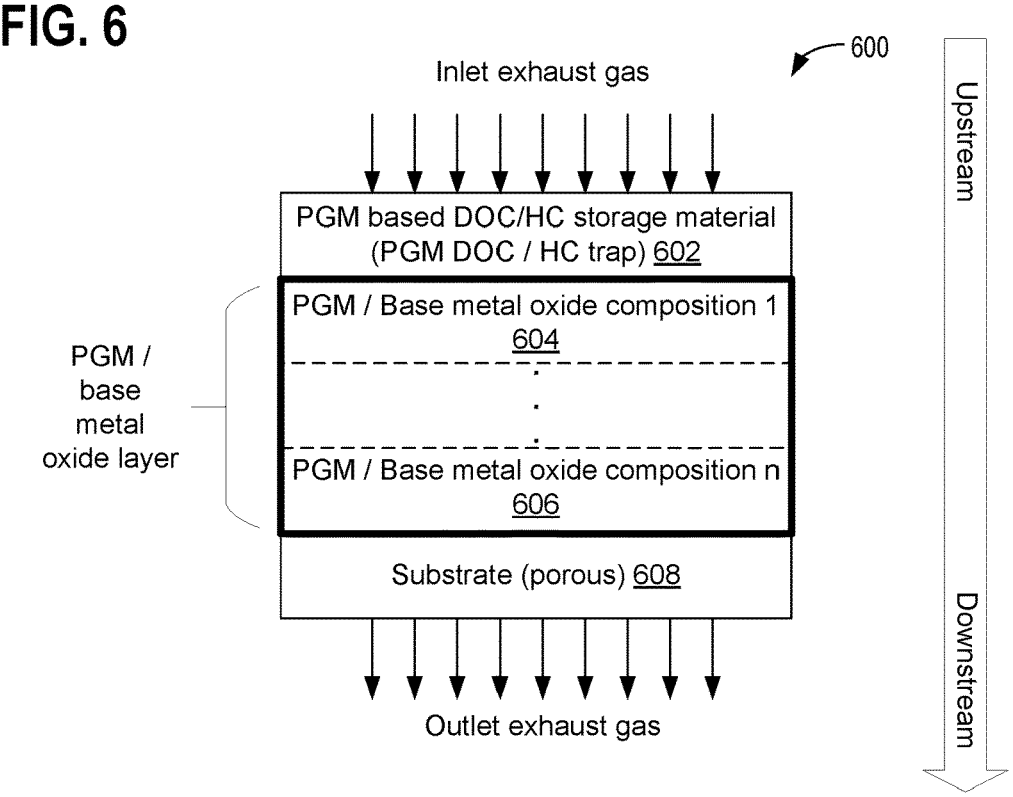
Figure 7:
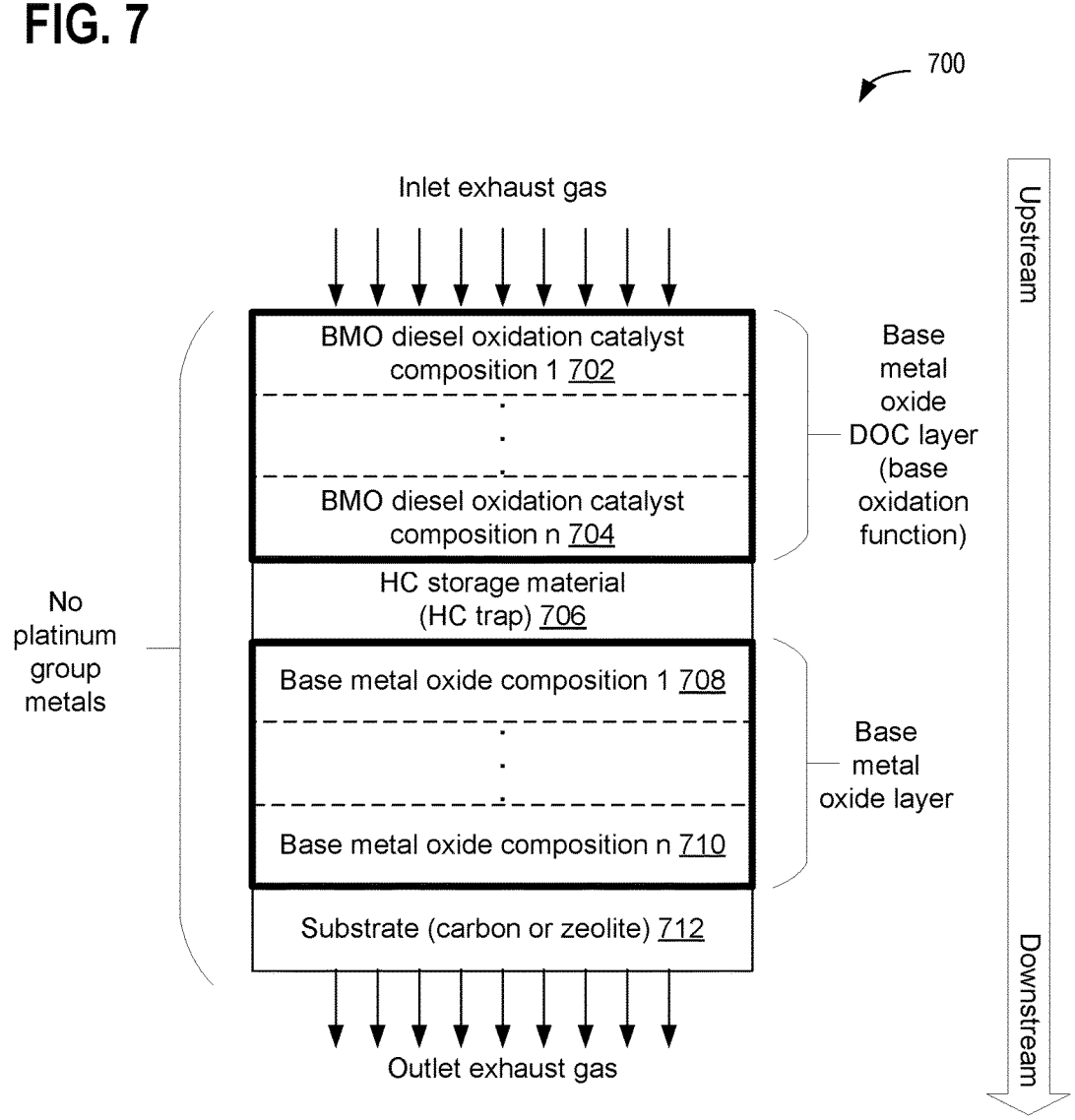
FIGS. 7-9 show example embodiments of the layered emission control device of FIGS. 2A and 2B without platinum group metals.
Figure 10:
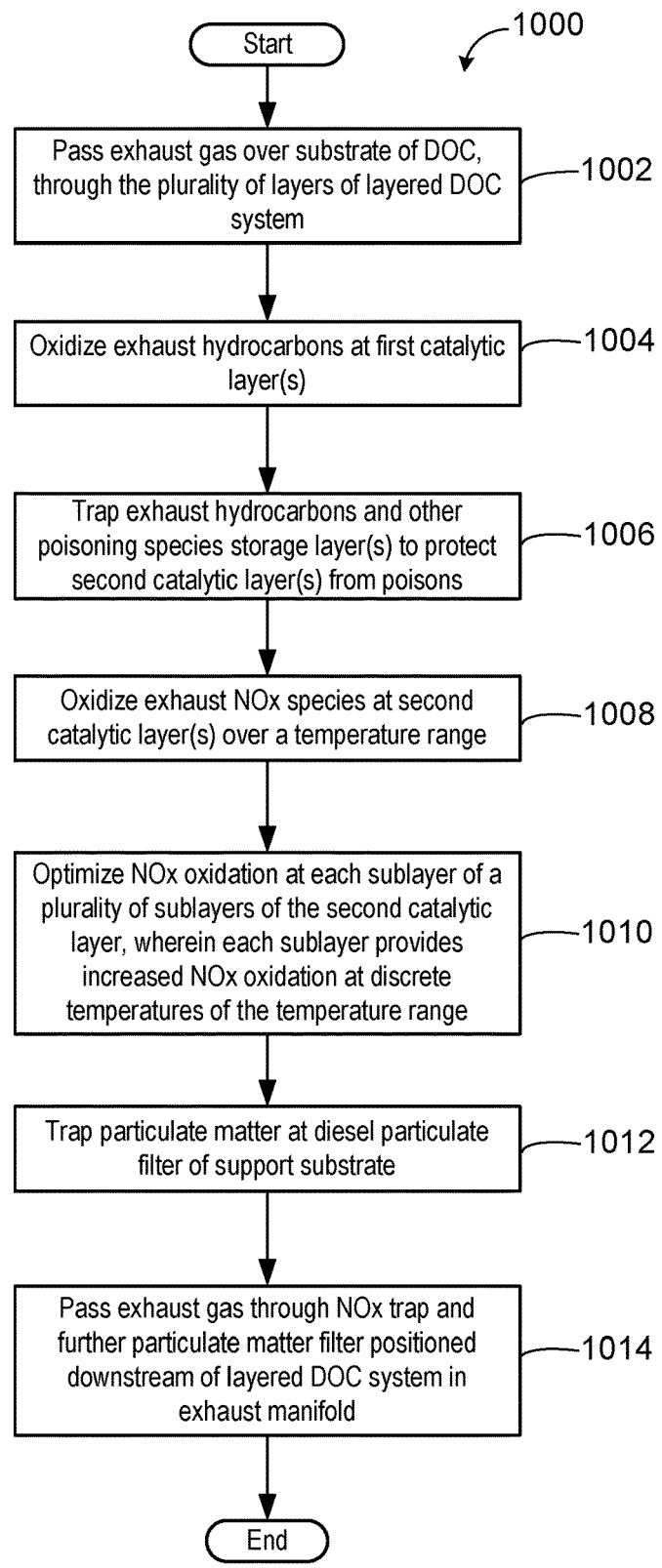
FIGS. 10 and 12 depict flow charts illustrating routines for operating the engine system of FIG. 1 including the layered emission control device of FIGS. 3-9.
Figure 11:
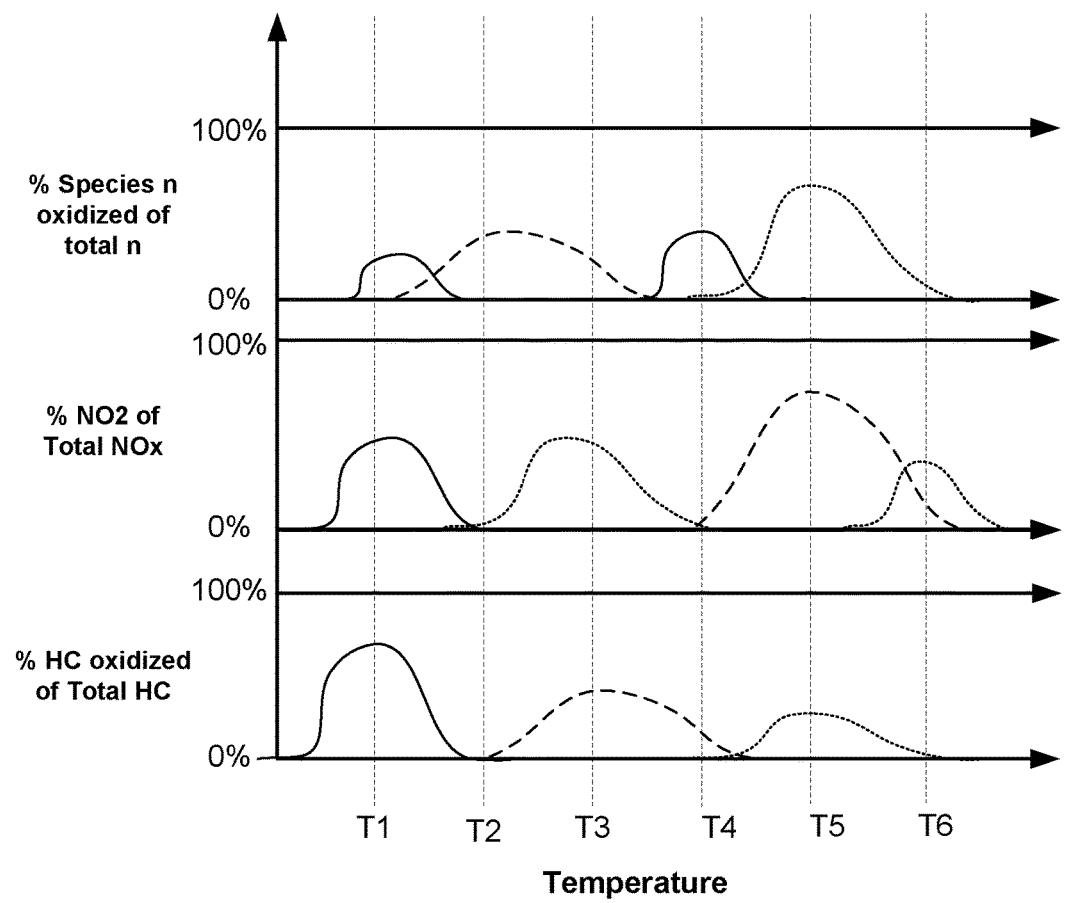
FIG. 11 shows an example plot of catalyst effectiveness for a layered ECD, such as the layered ECDs of FIGS. 2A, 2B, and 3-9, including multiple catalyst compositions.
Figure 11:
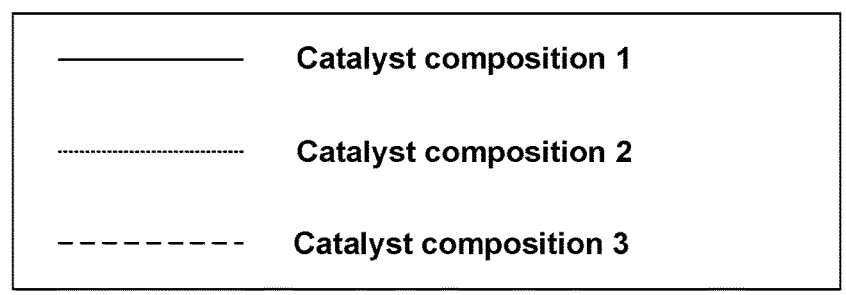

The various formulations and arrangements of layers are depicted by way of non-limiting examples in FIGS. 3-9. As shown in FIG. 7, exhaust gas may be passed over and through the layered device to retain and oxidize exhaust hydrocarbons and raise the exhaust temperature, while oxidizing exhaust NO species to $NO_2$ for subsequent capture on a downstream NOx trap or for low temperature reduction in a Selective Catalytic Reduction (SCR) catalyst that may use urea or another NOx reductant. In this way, the quality of exhaust emissions may be improved. For the purposes of discussion, FIGS. 1-9 will be described collectively. A method of operating an engine system including a layered ECD, such as the layered ECDs of FIGS. 2A, 2B, and 3-9, is illustrated in FIG. 10. A layered ECD, such as the layered ECDs of FIGS. 2A, 2B, and 3-9, may aid in increasing catalyst effectiveness over a broader range of engine operating conditions, as illustrated in the plots of FIG. 11.

FIG. 1 shows a schematic depiction of an engine system 2 including an engine 4 having a plurality of cylinders 6. Engine 4 includes an engine intake 8 and an engine exhaust 16. Engine intake 8 includes a throttle 10 fluidly coupled to the engine intake manifold 12 via an intake passage 14. Engine exhaust 16 includes an exhaust manifold 18 leading to an exhaust passage 20 that routes exhaust gas to the atmosphere. Engine exhaust 16 includes an emission control system 22 having one or more emission control devices 24 mounted in a close-coupled position. The one or more emission control devices may include various combinations and arrangements (as shown in FIG. 2) of a layered diesel oxidation catalyst (described in FIGS. 3-9), three-way catalyst, lean NOx trap, SCR catalyst, diesel particulate filter, oxidation catalyst, etc. It will be appreciated that other components may be included in the engine such as a variety of valves and sensors.

In optional embodiments, engine intake 8 may further include a boosting device, such as a compressor 26. Compressor 26 may be configured to draw in intake air at atmospheric air pressure and boost it to a higher pressure. The boosting device may be a compressor of a turbocharger, where the boosted air is introduced pre-throttle, or the compressor of a supercharger, where the throttle is positioned before the boosting device. Using the boosted intake air, a boosted engine operation may be performed.

In some embodiments, fresh air is introduced along intake passage 14 into engine 6 via air cleaner 27 and flowing to compressor 26. A flow rate of ambient air that enters the intake system through intake air passage 14 may be controlled at least in part by controlling throttle 10. Compressor 26 may be any suitable intake-air compressor, such as a motor-driven or driveshaft driven supercharger compressor.

As depicted in FIG. 1, compressor 26 is coupled, through charge-air cooler 29 to throttle valve 10. Throttle valve 10 is coupled to intake manifold 12. From the compressor, the compressed air charge flows through the charge-air cooler 29 and throttle valve 10 to the intake manifold 12. The charge-air cooler 29 may be an air-to-air or air-to-water heat exchanger, for example. In the embodiment shown in FIG. 1, the pressure of the air change within the intake manifold is sensed by manifold air pressure (MAP) sensor 31. A compressor by-pass valve (not shown) may be coupled in series between the inlet and the outlet of compressor 26. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 12 may be coupled to a series of combustion cylinders 6 through a series of intake valves (not shown). The combustion cylinders may be further coupled to exhaust manifold 18 via a series of exhaust valves (not shown). In the depicted embodiment, a single exhaust manifold 18 is shown. However, in other embodiments, the exhaust manifold may include a plurality of exhaust manifold sections. Configurations having a plurality of exhaust manifold sections may enable exhaust and/or effluent from different combustion chambers to be directed to different locations in the engine system or may allow for diversion of exhaust gases to separate emissions control systems 22 downstream.

Combustion cylinders 6 may be supplied on or more fuels such as gasoline, alcohol fuel blends, diesel, biodiesel, compressed natural gas, and ethanol fuel blends (including E10, E85), etc. Fuel may be supplied to the combustion cylinders via injector 34. In the depicted example, fuel injector 34 is configured for direct injection though in other embodiments, fuel injector 34 may be configured for port injection or throttle valve-body injection. Further, each combustion cylinder 6 may include one or more fuel injectors of different configurations to enable each cylinder to receive fuel via direct injection, port injection throttle valve-body injection, or combinations thereof. In the combustion cylinders, combustion may be initiated via spark ignition and/or compression ignition.

Additionally, engine system 2 may be coupled to a fuel system 28 including a fuel tank 30 coupled to a fuel pump system 32. Fuel tank 30 may be configured to hold any or any combinations of fuels such as gasoline, alcohol fuel blends, diesel, biodiesel, compressed natural gas, and ethanol fuel blends (including E10, E85), etc. Fuel pump system 32 may include one or more pumps for pressurizing fuel delivery to injectors 34 of engine 4. While only a single injector 34 is shown, additional injectors are provided for each cylinder. It will be appreciated that fuel system 28 may be a return-less fuel system, a return fuel system, or any other applicable type of fuel system.

Vehicle system 36 may further include control system 38. Control system 38 is shown receiving information from a plurality of sensors 40 (various examples of which are described herein) and sending control signals to a plurality of actuators 42 (various examples of which are described herein). As one example, sensors 40 may include exhaust gas sensor 44 located upstream of the emission control system, temperature sensor 46, and pressure sensor 48. Other sensors such as additional pressure, temperature, air/fuel ratio, and composition sensors may be coupled to various locations in the vehicle system 36, as discussed in more detail herein. As another example, the actuators may include fuel injector 34, and throttle 10. The control system 38 may include a controller 50. The controller may receive input data from the various sensors, process the input data, and trigger the actuators in response to the processes input data based upon instructions or code programmed therein corresponding to one or more routines. Sensors 40, optionally or additionally comprising temperature sensor 46 and pressure sensor 48, may determine a level of catalytic efficiency at the emission control system 22 and/or individual emissions control devices 24. Based upon data obtained at sensors 40 regarding the level of catalytic activity at the emission control system 22 and/or individual emissions control devices 24, actuators 42 may receive control signals from control system 38 to alter engine performance to achieve increased catalytic efficiency. As an example, an increased volume of intake or charge air may be brought in through the intake manifold in order to adjust an exhaust temperature and/or an exhaust pressure to ranges in which the catalyst and/or catalyst composition is known to provide higher catalytic efficiency, thereby reducing exhaust emissions such as NOx emissions. Furthermore, based upon data received at sensors 40, controller 50 may deliver alerts to an on-board diagnostics computer such that an operator of vehicle system 36 may be made aware of DOC performance. If DOC performance drops below an emissions treatment threshold, an operator of vehicle system 36 may be alerted by any combination of sound, visual, or tactile alert.

All or part of the treated exhaust from emission control system 22 may be released into the atmosphere via exhaust passage 20. Emission control devices 24 may include a diesel oxidation catalyst, a diesel particulate filter (DPF), a three way catalyst (TWC), a NOx trap, a NOx catalyst, various other emission control devices, or combinations thereof. As an example, device 24 may be a selective catalytic reduction (SCR) system which operates to reduce NOx emissions by introducing a reductant, such as urea, into the exhaust gas stream. The emission control device 24 may also be referred to as an exhaust catalyst and may further include a temperature sensor that may be used for determining the temperature of the exhaust catalyst. Optionally or additionally, temperature sensor 46 and pressure sensor 48 may be positioned at emissions control device 24.

FIG. 2A shows an example embodiment of emission control system 22. Emission control system 22 may include one or more emission control devices 24 coupled to engine exhaust manifold 18. These may include, for example, a layered emissions control device (ECD) 202, positioned upstream of a NOx aftertreatment device 204, and a particulate matter (PM) control device 206. The NOx aftertreatment device 204 may include, for example, a lean NOx trap (LNT) or a NOx reducing catalyst (e.g., an SCR catalyst), while the PM control device may include, a PM filter or a diesel particulate filter (DPF). While the depicted embodiment shows the NOx aftertreatment device 204 upstream of the PM control device 206, in alternate embodiments, the NOx aftertreatment device may be positioned downstream of the PM control device 206. By positioning the layered ECD 202 upstream of the NOx aftertreatment device and the PM control device, various advantages may be achieved. As one example advantage, exhaust hydrocarbons may be oxidized in one of the layers of the layered ECD to raise the temperature of the exhaust gas above a threshold temperature, such as above a regeneration temperature of the PM device. As another example, exhaust hydrocarbons may be retained in one of the layers of the layered ECD to reduce functional interference of the hydrocarbons with the NOx aftertreatment device. In this way, by passing exhaust gas over (and through) the layered ECD before passing the exhaust gas over the downstream NOx catalysts and PM filters, various exhaust components may be progressively processed and the quality of exhaust emissions may be improved.

Optionally or additionally, a reducing agent delivery system 208 may be included in emission control system 22, for example, upstream of the NOx aftertreatment device 204. The reducing agent delivery system may be configured to inject an appropriate reducing agent (such as ammonia or urea) to the exhaust gas just before the exhaust enters the NOx aftertreatment device.

Optionally or additionally, emissions control devices (e.g., 202, 204, 206, and 208) may be combined or repeated downstream or upstream of one another in order to further reduce exhaust emissions. As a non-limiting example, a layered ECD may be placed upstream of a NOx aftertreatment device, the layered ECD and the NOx aftertreatment further located upstream of a second layered ECD 210, as illustrated in FIG. 2B. In certain embodiments, this configuration may provide additional reduction of exhaust emissions. In some examples, described in further detail below, a first layered ECD 202 may provide oxidation of a first exhaust species and/or first plurality of exhaust species while a second layered ECD 210 may provide oxidation of a second exhaust species and/or second plurality of exhaust species.

Various embodiments of the layered ECD (202) of FIG. 2A and the second layered ECD 210 of FIG. 2B are illustrated herein at FIGS. 3-9. The various embodiments include embodiments wherein a plurality of layers with distinct formulations are layered on, and supported by, a substrate support, as well as embodiments wherein one or more formulations are included in the same layer and one or more layers are layered within the substrate support. The following embodiments are not limiting embodiments and the layers disclosed may be mixed (e.g., two or more layers combined into one layer), repeated, or modified in any applicable way. Furthermore, although the layers are depicted in the following embodiments to have approximately similar thicknesses, the layers of the layered ECDs 202 and 210 may have thickness that vary significantly from one layer to another.

Figure 3:
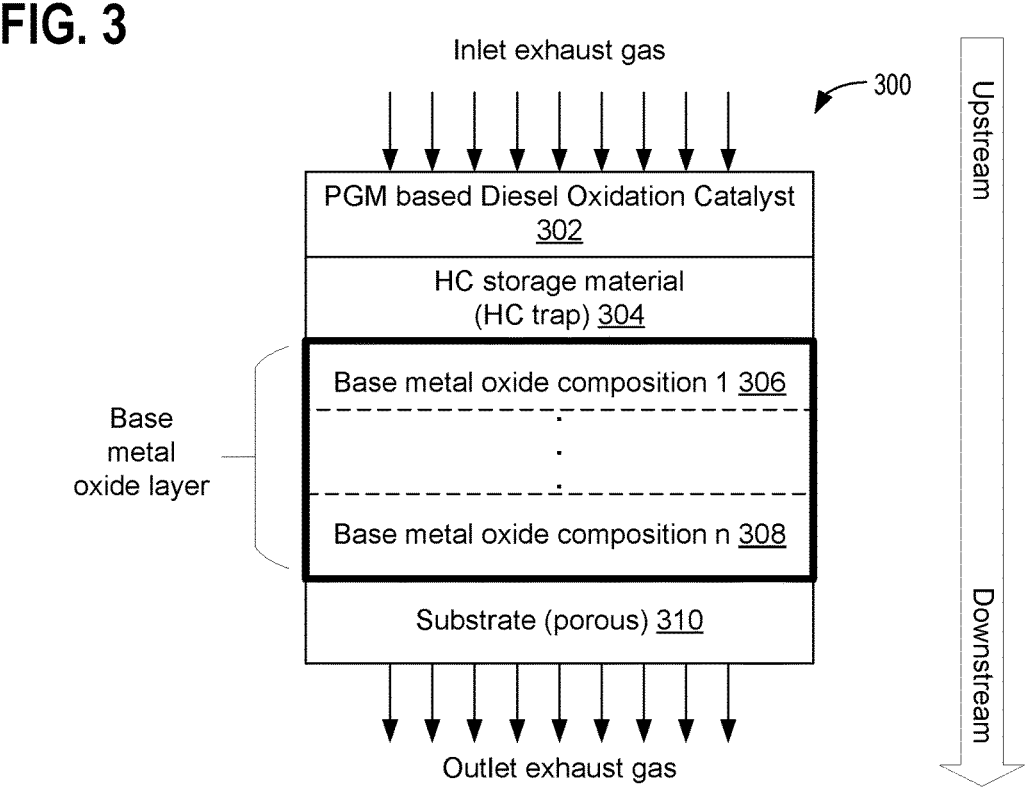
FIGS. 3-6 show example embodiments of the layered emission control device of FIGS. 2A and 2B.

Turning to FIG. 3, a first embodiment 300 is shown of a layered emission control device, (such as the layered diesel oxidation catalyst system 202 of FIG. 2A and 2B) coupled to a vehicle exhaust manifold (such as the exhaust manifold 18 of FIG. 1). The layered system may comprise a first, upper (or outer) layer 302 including a first, oxidizing catalyst. The first, oxidizing catalyst may be, for example, a diesel oxidation catalyst comprising a platinum group metal (PGM) or combination of PGMs. Herein, PGM may refer to one or more of ruthenium, rhodium, palladium, osmium, iridium, and platinum. As an example, the first, upper layer 302 may also be an upstream layer of the emissions control device, upstream referring to the flow direction of the exhaust gas as the exhaust gas leaves the engine and passes over the layered emission control device, such that the flowing exhaust gas passes over the upstream layer of the ECD prior to layers positioned further downstream therefrom. The layered emission control device may further comprise a second, intermediate layer 304 including a hydrocarbon (HC) trap for trapping exhaust HCs. As an example, the second, intermediate layer 304 may also be positioned downstream of the first, upper layer 302 wherein exhaust gas passes first over the first, upper layer 302 and then passes over second, intermediate layer 304.

The layered emission control device may also further comprise a third, lower (or inner) layer 306 including a second, different catalytic layer which may be a base metal oxide (BMO) layer having a composition of base metal oxides. As an example, the third, lower layer may be a NOx oxidation catalyst configured to oxidize exhaust species to $NO_2$ species. In some cases, the second layer 304 may be positioned between (intermediate to) the first and third layers 302 and 306. As an example, the third, lower (or inner) layer 306 may be positioned downstream of the intermediate layer 304, and further downstream than layer 302, wherein exhaust gas passes first over the first, upper layer 302 and then passes over second, intermediate layer 304 and then passes over the third layer 306. The layered device of FIG. 3 may further comprise substrate support 310 which may be even further downstream of layers 302, 304, and 306. As an example, exhaust gas may pass first over the first, upper layer 302 and then pass over second, intermediate layer 304 and then pass over the third layer 306 and finally over substrate support 310.

In this way, the terms first, second, and third, when referring to layers of the layered emissions control device, may indicate a more upstream layer, an intermediate layer, and a more downstream layer, respectively. In other words, the first, second, and third layers may refer to layers positioned successively more downstream, relative to the exhaust gas flow direction. Similarly, the terms upper, intermediate, and lower, when referring to layers of the layered emissions control device, may indicate a more upstream layer, an intermediate layer, and a more downstream layer, respectively. In other words, the upper, intermediate, and lower layers may refer to layers positioned successively more downstream, relative to the exhaust gas flow direction. Furthermore, the terms outer, intermediate, and inner, when referring to layers of the layered emissions control device, may indicate a more upstream layer, an intermediate layer, and a more downstream layer, respectively. In other words, the outer, intermediate, and inner layers may refer to layers positioned successively more downstream, relative to the exhaust gas flow direction. The exhaust gas may be directed from the exhaust manifold flow successively through each layer and/or sublayer of the layered ECD. In one example, the exhaust gas flows successively through each layer of the ECD from an upstream side to a downstream side. In another example, at least a portion of the exhaust gas flows successively through each layer from an upstream side to a downstream side. For example, a portion of the exhaust gas may be trapped and/or reacted within one or more upstream layers and/or sublayers of the ECD, and the remaining untrapped portion of the exhaust gas may flow through more downstream layers and/or sublayers of the ECD Flowing the exhaust gas successively through each layer of the DOC aids in achieving the advantages of reducing exhaust emissions, while maintaining or reducing the size of the emissions control system.

In some cases, the layered device of FIG. 3 may comprise additional inner BMO sublayers having different or repeating compositions such as BMO sublayer composition 1 306, and any number of additional BMO sublayers indicated by ellipsis (label on FIG. 3), and BMO sublayer composition n 308. The inner BMO sublayers may be organized in such a way to exploit certain functional synergies between the different catalytic BMO sublayers, as described below. In some cases, the layered system may further comprise a substrate support 310. The third, inner BMO sublayer 306 and additional BMO sublayers through 308, may be layered directly on top (e.g., upstream) of the substrate support 310, as depicted in FIG. 3, while the second HC storage layer 304 may be layered on (e.g., upstream of) the BMO sublayers 306 through 308. The first, upper PGM based DOC layer 302 may be layered on (e.g., upstream) the second layer 304. As an example, there may be between 1 and 10 BMO sublayers. As an example, there may be 3 BMO sublayers. As an example, there may be 4 BMO sublayers.

As an example, substrate support 310 may be of any suitable material such as cordierite, aluminum titanate, aluminum oxide, silicon dioxide, titanium dioxide, cerium dioxide, vanadium oxide, lanthanum oxide, mullite, silicon carbide, zirconium dioxide, baddeleyite, and zeolite material of any appropriate family including aluminosilicates and silicoaluminophosphates (SAPOs). In some cases, washcoat supports of 302, 304 and/or 306 may be doped with any rare earth metals, transition metals, or lanthanides. In an example, washcoat support 302 may be doped with lanthanum and/or neodymium in order to increase the stability of the washcoat support as well as the overall layered emission control device. As an additional example, the washcoat support 302 may comprise two washcoats: a first, stabilized zirconia washcoat comprising a lanthanum and zirconium mixture; and a second, low-ceria washcoat comprising a mixture of cerium, yttrium, lanthanum, neodymium, and zirconium. The example washcoats described above may be coated on the substrate support 310 in any applicable order, and the washcoats may be calcined in order to bond to the substrate.

Additionally, substrate support 310 may have a porosity of 8 to 80%. In one example, the substrate support may have a porosity of between 25% to 35%. For example, the substrate support may have a porosity of 27%. In other embodiments, the substrate support 310 may comprise a diesel particulate filter (DPF) including a plurality of channels with alternating ends blocked. As an example, the DPF may have a porosity of between 40 to 80%. For example the DPF may have a porosity between 42 to 48%. As such, various suitable particulate filters may be used including cordierite, aluminum titanate, mullite and silicon carbide. The substrate support 310 of embodiment 300 may additionally comprise any of the substrate support compositions and/or characteristics described with respect to substrate supports disclosed in further embodiments.

The first, upper layer of the layered emissions control device 300 may be configured to be an oxidizing catalyst oxidizing HCs to raise an exhaust temperature above a threshold ECD temperature. The exhaust temperature may refer to a temperature of the exhaust gas temperature within the layered ECD. In another example, the exhaust temperature may refer to a temperature of upper layer 302 or one or more of the layers downstream thereof. For example, the first oxidizing catalyst of the first layer may oxidize exhaust HCs to periodically generate an exotherm for downstream particulate filters or HC traps, the exotherm raising the exhaust temperature above the threshold ECD temperature, thereby oxidizing particulate matter trapped in the DPF and/or other particulate filters, to gaseous products. As an example, the periodicity of exotherm generation may be based upon an actual soot load and/or particulate load at the DPF, optionally or additionally the periodicity of exotherm generation may be based upon a calculated soot load and/or particulate load at the DPF. As a further example, the periodicity of exotherm generation may be based upon a frequency of a volume of exhaust gas air passing over the layered emissions control device. In another example, the first oxidizing catalyst layer may oxidize exhaust HCs to periodically generate an exotherm raising the exhaust temperature above the threshold ECD temperature, thereby maintaining and/or promoting the catalytic activity of downstream layers such as the third, inner layer, optionally or additionally comprising a plurality of sublayers, including a base metal oxide (BMO) washcoat, the third, inner layer optionally or additionally comprising further platinum group metals (PGMs). In this way, exhaust temperature may be maintained above a threshold ECD temperature to aid in increasing efficiencies of downstream emission control devices, for example, for regeneration of a downstream particulate matter filter. As an example, a threshold ECD temperature may be 200° C. As an example, a threshold ECD temperature may be 300° C. As an example, a threshold ECD temperature may be 400° C. As an example, a threshold ECD temperature may be 500° C. Additionally, by including the HC oxidizing catalyst in one of the upper layers, the need for a separate, dedicated light-off catalyst, or other exhaust heat maintaining device, may be reduced and/or eliminated.

The HC storage layer (e.g., HC trap) 304 comprising HC storage materials may further include any suitable material such as cordierite, aluminum titanate, aluminum oxide, silicon dioxide, titanium dioxide, cerium dioxide, vanadium oxide, lanthanum oxide, mullite, silicon carbide, zirconium dioxide, baddeleyite, and zeolite material of any appropriate family including aluminosilicates and silicoaluminophosphates (SAPOs). In the embodiment of FIG. 3, the zeolite material of the HC storage material 304 may further include ion-exchanged metal such as Ag, Au, Cu, Fe and/or other metals known to promote HC adsorption. For example, the second layer 304 may have a microporosity that is configured to retain exhaust HC species or $SO_2$ poisons in the second layer 304 and prevent the HCs from entering the inner BMO sublayers. Furthermore, the pore size of the second layer 304 may be configured to enable exhaust NOx species to pass through the second layer 304 into the BMO sublayers. In this way, the second layer including the HC trap may act as a molecular sieve filtering out large molecular weight HCs and $SO_2$ poisons during lean-burn or low temperature conditions and protecting the inner BMO sublayers from the detrimental effects of HC adsorption.

The oxidizing catalysts of the inner BMO sublayers 306 through 308 may be configured to trap exhaust species and, optionally or additionally, may be configured to oxidize NOx species in order to provide a stable $NO_2$ source for downstream Urea-SCR, LNT, or other low temperature NOx adsorbers. The catalytic sensitivity of the oxidizing catalysts of the inner BMO sublayers may decrease with the presence of HC or poisons such as $SO_2$. At the same time, the second layer may be sized to enable exhaust NOx species to pass through the second layer into the third layer. In this way, the second layer including the HC trap 304 may act as a molecular sieve filtering out large molecular weight HCs during lean-burn or low temperature conditions and protecting the NOx oxidizing catalyst and/or catalysts within one or more of the BMO sublayers 306 to 308 from the detrimental effects of HC adsorption. By incorporating the NOx oxidizing catalyst within one of the layers, the need for a dedicated NOx oxidation device, such as a plasma reactor, may be reduced or eliminated. Additionally, by incorporating the NOx oxidizing catalyst within one of the layers, the need for a separate, dedicated reducing agent delivery system 208, may also be reduced or eliminated. Additionally, the inner BMO sublayers 306 through 308 may be configured to trap NOx species during engine cold-starts and thermally desorb the NOx species as emission control system temperature increases to normal operating temperatures. For example, increasing an exhaust temperature above a threshold ECD temperature may also aid in thermally desorbing the NOx species. Having additional BMO sublayers may provide for increased trapping of NOx species.

In the depicted embodiment, only the PGM-based DOC may be included in the first layer 302, while the HC trap and the NOx oxidizing catalyst are excluded from the first layer. In the same manner, only the HC trap may be included in the second layer 304 while the first and second oxidizing catalysts are excluded from the second layer, and only the NOx oxidizing catalyst may be included in the third layer, while the HC trap and the PGM-based DOC are excluded from the third layer. In this way, the different functionalities may be separated in different layers to reduce functional interference while enabling synergy between the functions.

The various layers may be configured with different washcoat loadings. Additionally the precious metal loading of the different layers may vary. For example, the first layer may have a first washcoat loading and a first precious metal loading, the second layer may have a second washcoat loading and a second precious metal loading, and the third layer may have a third washcoat loading and a third precious metal loading, any of the sublayers may have additional washcoat loadings and/or additional precious metal loadings specifically selected for each of the sublayers. The first, second, and third washcoat loadings and precious metal loadings may be selected based on the functionality of the layer. For example, some layers or sublayers (e.g., the first DOC layer) may include a higher precious metal loading while other layers or sublayers (e.g., the third BMO layer) may or may not include any precious metal loading. Additionally, the loadings may be tailored to a specific vehicle application and a specific exhaust emission profile of the engine. In still further embodiments, the washcoat and precious metal loadings may be adjusted based upon the engine exhaust HC content. The engine exhaust HC content may vary based upon fuel type, engine age, geographic region, climate, or any other factors. In one example, the total washcoat loading may be in the range of 0.1 to 9.0 $g/in^3$, with different washcoat loading distributions for the different layers and/or sublayers. In another example, the total washcoat loading may be in the range of 1.00 to 4.5 $g/in^3$, with different washcoat loading distributions for the different layers and/or sublayers. The total washcoat loading may refer to the mass concentration of washcoat per unit volume of the layered ECD.

In one example, the washcoat loading of first, outer layer 302 including the DOC may be 0.25 to 1.5 $g/in^3$. In another example, the washcoat loading of the first, outer layer may 302 be 1.0 $g/in^3$. The first, outer layer 302 may also have a precious metal loading with a platinum (Pt) and/or palladium (Pd) content of 15 to 300 $g/ft^3$. In one example, the first outer layer 302 may have a precious metal loading with a platinum (Pt) and/or palladium (Pd) content of 150 $g/ft^3$. The ratio of Pt to Pd may be in the range of 1:10 to 0:1. In one example the Pt to Pd range may be 0:1, as platinum-based DOCs have been shown to exhibit degraded NOx oxidation sensitivity under the typical operating conditions of on-road diesel vehicles. Thus, excluding Pt from the first outer layer 302 can aid in reducing NOx exhaust emissions.

The washcoat loading of second layer 304 including the HC trap may be 0.25 to 1.5 g/in$^3$. In one example, the washcoat loading of second layer 304 may be 1.0 g/in$^3$. The second layer 304 may further include any suitable material such as cordierite, aluminum titanate, aluminum oxide, silicon dioxide, titanium dioxide, cerium dioxide, vanadium oxide, lanthanum oxide, mullite, silicon carbide, zirconium dioxide, baddeleyite, and zeolite material of any appropriate family including aluminosilicates and silicoaluminophosphates (SAPOs). In the embodiment of FIG. 3, the first and third layers may or may not include zeolite material. The zeolite material of the second layer 304 may further include ion-exchanged metal such as Ag, Au, Cu, Fe and/or other metals known to promote HC adsorption.

The washcoat loadings of the third, inner BMO sublayers 306 through 308 including the NOx oxidation catalyst may be 0.25 to 1.5 g/in$^3$. In one example, the washcoat loadings of the inner BMO sublayers may be 1.0 g/in$^3$. The inner BMO sublayers 306 through 308 may be configured to include any Pt group metals or may be configured to include no Pt group metals. The inner BMO sublayers may include mixed metal oxides or base metal oxides (BMOs). In an example, the inner BMO sublayers may include single or mixed base metal oxides in a range of 2 to 75 wt % within the layer. In an example, the inner BMO sublayers may include single or mixed base metal oxides at 30 wt % within the layer. In an example, the washcoat loadings, Pt group metal loadings, and/or BMO loadings may be applied to additional BMO sublayers 306 through 308.

In one example, the metal oxides comprising at least the BMO sublayers 306 through 308 may include Mn, Co, W, Mo, Cu Fe, Ce, and Ni. In one example a BMO sublayer comprises a Mn, Cu, W mixture. In one example a BMO sublayer comprises a Mn, Mo, W mixture. In one example a BMO sublayer comprises a Mn, Cu, Ni mixture. In one example a BMO sublayer comprises a Co, Cu, W mixture. In one example a BMO sublayer comprises a Mn, Co, W mixture. In one example a BMO sublayer comprises a Cu, Ni, Fe, W mixture. In one example a BMO sublayer comprises a Mn, Cu, Ce mixture. In one example a BMO sublayer comprises a Co, Ce, Mo mixture. In one example a BMO sublayer comprises a Cu, Ni, Fe, Mo mixture. In one example a BMO sublayer comprises a Mn, Cu, W mixture. In one example a BMO sublayer comprises a Co, Mo, W mixture. In one example a BMO sublayer comprises a Mn, Cu, Ni, Fe mixture. In any of the above mixtures, metals may be exchanged, replaced, added, or removed.

In one example, a BMO sublayer is prepared via metal salts mixed in an aqueous solution, the metals in the metal salts corresponding to the metals comprising the BMO sublayer metal mixture. The mixed metal salt aqueous solution may be wetted onto zeolite material. In one example, the aqueous BMO salt solution may be wetted onto zeolite material and then calcined to bond the BMOs to the substrate support. Additional, upper BMO sublayers (such as FIG. 3, 306 through 308) comprising distinct compositions may also be mixed in an aqueous solution from metal salts, wetted onto the previously-calcined BMO sublayer (e.g., a lower BMO sublayer, for example 308, calcined to the substrate support), and then calcined to bond an upper BMO sublayer to the lower BMO sublayer. This process may be repeated in order to stack as many BMO sublayers as desired. In one example, the zeolite material may be $ZrO_2$ and the zeolite material may be doped with La and/or Nd in order to increase the stability of the support substrate as well as the overall layered emission control device.

In one example, the BMO layer may comprise multiple sublayers within the BMO layer comprising individual BMO compositions, the individual BMO sublayers having different or repeating compositions illustrated in FIG. 3 as 306 through 308. In one example, the multiple layers within the BMO layer may be any of the BMO layer compositions disclosed above. As an example, the use of multiple BMO layers with different BMO compositions may be useful as different compositions of BMOs may benefit robust oxidation function by providing oxidation function across different ranges of temperatures. As an example, a first BMO sublayer 306 having a first BMO composition may provide robust oxidation during an engine cold start, the oxidation provided up to a first threshold temperature. As an example, a second BMO layer having a second BMO composition may provide NOx oxidation up to a second threshold temperature greater than the first threshold temperature. As an example, an additional BMO sublayer 308 having an additional BMO composition may provide NOx oxidation up to a further threshold temperatures greater than the second threshold temperature. Indicated by the ellipsis in FIG. 3, there may be a number of additional BMO sublayers interposed between BMO sublayer 1 306 and BMO sublayer n 308 providing increased NOx oxidation at additional temperature ranges. In this way, a plurality of BMO sublayers, in combination, can oxidize NOx oxidation over a broader temperature range than a single BMO layer, thereby reducing NOx emissions, while reducing a size of the emissions control system.

The plurality of BMO sublayers of different or repeating compositions may be incorporated into the layered ECD, the BMO sublayers having different or repeating washcoat loadings, with each BMO layer of the plurality of BMO sublayers configured to provide higher NOx oxidation rates within specific temperature ranges and/or at specific temperatures, and the temperatures or ranges of temperatures may or may not be overlapping and/or repeating in order to increase NOx oxidation. Additionally, as an example, each BMO sublayer of the plurality of BMO sublayers may be configured to provide increased NOx oxidation additionally or optionally based upon any ranges and/or configurations relating to the operating conditions of the exhaust and/or exhaust system and/or engine configurations, such as, optionally or additionally including but not limited to temperature, manifold air pressure, CO exhaust concentrations, HC exhaust concentrations, S exhaust concentrations, PGM concentrations in the layered DOC system, porosities of HC storage materials, exhaust airflow speed, fuel make up, octane rating, cetane number, and/or soot exhaust concentrations. For example, a single BMO sublayer may exhibit higher NOx oxidation rates over a first engine operating condition, while exhibiting lower NOx oxidation rates over engine operating conditions outside of the first engine operating condition. As described herein, additional BMO sublayers may be employed upstream or downstream of the single BMO sublayer to augment the BMO layer of the ECD by providing higher NOx oxidation rates during engine operating conditions outside of the first engine operating conditions. In this way, the augmented ECD, including a plurality of BMO sublayers, can exhibit increased NOx oxidation rates over a broad range of engine operating conditions, including the first engine operating condition and engine operating conditions outside of the first engine operating condition. As described previously, the engine operating conditions can refer to an engine operating temperature, MAP, CO exhaust concentration, HC exhaust concentrations, S exhaust concentrations, PGM concentrations in the layered DOC system, porosities of HC storage materials, exhaust airflow speed, fuel make up, octane rating, cetane number, and/or soot exhaust concentrations, and the like.

Any BMO layer, PGM layer, BMO/PGM layer, and HC trap/BMO layer comprising sublayers may be configured such that the pluralities of sublayers of the abovementioned layers may be configured to have different or repeating distinct compositions, the compositions of the distinct sublayers being configured to provide increased oxidation (e.g., higher HC and/or NOx oxidation rates) within specific, discrete temperature ranges and/or at specific, discrete temperatures. As an example, the abovementioned layers may provide oxidation over a range of temperatures while the sublayers of the abovementioned layers may provide increased oxidation of exhaust species within specific temperature ranges and/or at specific temperatures. The temperatures or ranges of temperatures may or may not be overlapping and/or repeating in order to increase oxidation of one or more exhaust species within the emissions control system. As an example, any of the abovementioned layers, comprising a plurality of sublayers, may provide oxidation over a range of temperatures from 100° C. to 700° C., and a first sublayer may provide oxidation from 100° C. to 200° C., a second sublayer may provide oxidation from 200° C. to 300° C., a third sublayer may provide oxidation from 300° C. to 400° C., and a fourth sublayer may provide oxidation from 400° C. to 500° C., and a fifth sublayer may provide oxidation from 500° C. to 600° C., and a sixth sublayer may provide oxidation from 600° C. to 700° C. As a further example, any of the abovementioned layers may provide oxidation over a range of temperatures from 100° C. to 700° C., and a first sublayer may provide increased oxidation at 100° C., a second sublayer may provide increased oxidation at 200° C., a third sublayer may provide increased oxidation at 300° C., a fourth sublayer may provide increased oxidation at 400° C., and a fifth sublayer may provide increased oxidation at 500° C., a sixth sublayer may provide increased oxidation at 600° C., and a seventh sublayer may provide increased oxidation at 700° C. As a further example, any desired temperature ranges and/or temperatures may be provided based upon further sublayer catalyst compositions.

Figure 4:
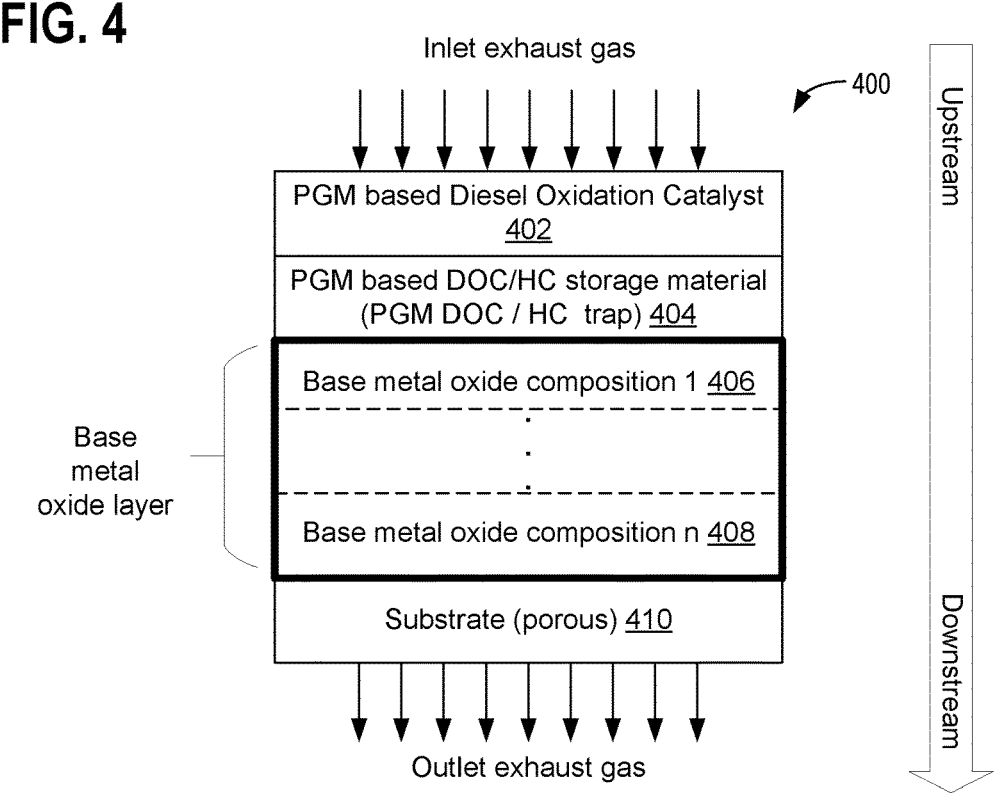

Turning to FIG. 4, an alternative embodiment of a layered ECD 400 is provided. Layered ECD 400 comprises a first, upper DOC layer 402 configured to oxidize exhaust hydrocarbons to raise an exhaust temperature, the first DOC layer may comprise PGMs such as Pd. In an example, alternative embodiment 400 may include a second DOC layer 404 configured to trap exhaust hydrocarbons and to prevent them from passing into the BMO sublayers 406 through 408 and substrate support 410. The second, intermediate layer 404 may be configured as a second DOC layer comprising additional HC storage material to have a microporosity that is configured to retain exhaust HC species and prevent HCs from entering the inner BMO sublayers 406 through 408. Layer 404 comprising both a PGM-based DOC and HC storage material may allow for HC trapping and oxidization within the same catalytic layer, which can increase an HC oxidation rate, and mitigate poisoning of the BMO layer 406. The pore size of the second layer 404 may be configured to enable exhaust NOx species to pass through the second layer into the third layer. In this way, the second layer including the HC trap may act as a molecular sieve filtering out large molecular weight HCs and $SO_2$ poisons during lean-burn or low temperature conditions and protecting the inner BMO sublayers from the detrimental effects of HC adsorption.

Additionally, alternative embodiment 400 may include inner BMO sublayers 1 406 through BMO sublayer n 408 which may be configured to comprise different or repeating oxidizing catalyst compositions which may comprise distinct base metal oxide (BMO) compositions. As an example, the inner BMO sublayers may be NOx oxidation catalysts configured to oxidize exhaust species to $NO_2$ species. In some cases, the second layer 404 may be positioned between the first and inner BMO sublayers 402 and 406 through 408. The inner BMO sublayers 406 through 408 may be layered directly on top of the substrate support 410, as depicted in FIG. 4, while the second layer 404 may be layered on (top of) the upper BMO sublayer having a first composition (composition 1) 406 and the first layer 402 may be layered on (top of) the second layer 404.

In the depicted embodiment 400, the DOC system may comprise a substrate support 410 that has a higher porosity (e.g., higher than a threshold porosity of below 40%). The high porosity substrate support may have a porosity of 8 to 80%. As an example, a higher porosity may allow for additional washcoats to be applied to the substrate and may further provide higher washcoat compatibility due to the increased porosity. As an example, a higher porosity may allow for a reduction of substrate heat capacity, thus providing faster thermal response (quicker light-off). The higher porosity substrate support may further aid in increase exhaust flow from the layered DOC 400. In one example, the substrate support may have a porosity of 30%. The high porosity variety of substrate support 410 may include, for example high porosity cordierite, aluminum titanate, aluminum oxide, silicon dioxide, titanium dioxide, cerium dioxide, vanadium oxide, lanthanum oxide, mullite, silicon carbide, zirconium dioxide, baddeleyite, and zeolite material of any appropriate family including aluminosilicates and silicoaluminophosphates (SAPOs). Furthermore, the high porosity support substrate may include a high porosity DPF substrate having a porosity in the range of 30 to 80%. In one example, the high porosity DPF substrate may have a porosity of 65%. The washcoat loadings, base metal oxide loadings, and precious metal loadings of any layers of embodiment 400 may include any of the washcoat loadings, base metal oxide loadings, and precious metal loading of any layers of layered ECD embodiments 300, 400, and 500, and the washcoat loadings, base metal oxide loadings, and precious metal loadings of any layers may be combined or altered to merge layers or repeat layers if so desired. The base metal oxide sublayers of 406 through 408 of FIG. 4 may be the same as sublayers 306 through 308, as described in FIG. 3.

Using such a high porosity substrate support may enable an additional catalyst, or formulation, to be incorporated within the substrate support. As an example, the third, inner BMO sublayers 306 through 308 and 406 through 408 may be incorporated within the substrate supports 310 and 410, while the intermediate and upper layers (e.g., 302, 304, 402, and 404) are supported by substrate supports 310 and 410. By including at least one of the layers within the substrate support, a size of the emissions control system may be reduced while also reducing an exhaust backpressure experienced in the layered emission control device. Additionally, attaining a light-off temperature may be expedited due to reduction of total catalytic surface area. The PGM and BMO washcoat loading of the different layers of the embodiment of FIG. 4 may be similar to those discusses previously with reference to FIG. 3.

Turning now to FIG. 5, another alternative layered ECD embodiment 500 is herein disclosed. Embodiment 500 discloses a layered diesel oxidation catalyst system comprising a first layer 502 (e.g., a first outer diesel oxidation catalyst layer) configured to trap and oxidize hydrocarbons. In this example, the first and second layers of FIGS. 3-4 are merged within a single layer or included one within the other to provide synergistic benefits and further improve the spatial parameters of the emissions control device (ECD). For example, merging the exemplary first and second layers of embodiments 300 and 400 into a single layer 502 (or 602) can reduce a size of the ECD. In this first layer 502, exhaust HCs may be trapped, and the trapped exhaust HCs may be oxidized by the first oxidation catalyst to raise an exhaust temperature and periodically generate an exotherm for downstream emission control devices. The combined DOC and HC layer 502, as mentioned above relating to layer 404 of embodiment 400, may provide additional synergistic benefits of more efficiently oxidizing HCs since the HCs are also trapped and immobilized within the combined DOC and HC layer 502, thereby providing increased protection from HC poisoning of the inner BMO sublayers 504 through 506 by reducing an amount of HC byproducts generated within the first (merged) layer 502 from reaching and poisoning the inner BMO sublayers 504 through 506. In one example, the first layer 502 may be formed by wetting and depositing (e.g., calcining) one or more washcoats on to a porous substrate. In particular, each of the multiple washcoats may correspond to a catalyst composition selected to provide a HC oxidation functionality. Furthermore, the pore size distribution of the carbon or zeolite porous material may be selected to provide HC trapping functionality, as described with respect to the pore size distribution of layers 304 and/or 404. In one example, the porous substrate may include a carbon or zeolite porous material. The layered ECD may further include inner base metal oxide sublayers 504 through 506 which may optionally or additionally be configured to include any Pt group metals. The inner BMO sublayers may include mixed metal oxides or single base metal oxides (BMOs). In an example, the BMO sublayers 504 through 506 may include single or mixed base metal oxides in a range of 2 to 75 wt % within the layer. In an example, the BMO sublayers may include single or mixed base metal oxides at 30 wt % within the layer. In one example, the metal oxides may include Mn, Co, W, Mo, Cu Fe, Ce, Ni. In one example, the metal oxides are salts mixed in an aqueous solution which may be wetted onto zeolite material. In one example, the aqueous BMO salt solutions may be wetted onto zeolite material and then calcined to bond the BMOs to the substrate support. For any of the layered DOC embodiments herein, an innermost BMO salt solution may first be wetted onto the zeolite material, then calcined to bond the innermost BMO salt composition to the substrate support. Additionally, further BMO sublayer compositions may be wetted on top of a previously calcined BMO sublayer, in order to calcine one BMO sublayer to another, so as to stack the appropriate BMO sublayers in the desired arrangement for facilitating increased oxidation of NOx species. In an example, the zeolite material may be $ZrO_2$ and the zeolite material may be doped with La and/or Nd in order to increase the stability of the support substrate as well as the overall layered emission control device. The layered ECD of embodiment 500 may further include a substrate support 508. In one example substrate support 508 may be the same substrate as disclosed with reference to embodiment 300, element 310, or embodiment 400, element 410. In another example, the base metal oxide sublayers of embodiment 400 may comprise any of the compositions as disclosed as the sublayers of embodiment 300. Optionally or additionally, as mentioned above with respect to embodiments 300 and 400, any or all of the inner BMO sublayers 504 through 506 may be incorporated directly into the substrate support 508 in order to maintain or reduce a size of the emissions control system while reducing exhaust emissions.

With reference to FIG. 5, the total washcoat loading may remain in the range of 1.00 to 4.5 $g/in^3$, with different washcoat loading distributions for the different layers. In particular, the washcoat and precious metal loadings of PGM-based DOC layer, HC trap layer, and Base Metal Oxide catalyst sublayers may be the same as those indicated in FIGS. 3 and 4, and/or may comprise any combination of washcoat and precious metal loadings from FIGS. 3 and 4. However, the washcoat loading and precious metal loading between layers may vary. In one example, the washcoat loading of merged layer 502 having the HC oxidation catalyst function (PGM based DOC) and the HC trap function may be 0.25 to 2.5 $g/in^3$. In one example, the washcoat loading of merged layer 502 having the HC oxidation catalyst function (PGM based DOC) and the HC trap function may be 1.5 $g/in^3$. In one example, the washcoat loading of the BMO sublayers 504 through 506 having the BMO catalyst for NOx oxidation may be 0.25 to 2.5 $g/in^3$. In one example, the washcoat loading of the BMO catalysts for NOx oxidation may be 1.5 $g/in^3$. The washcoat loadings and precious metal loadings of any layers and/or sublayers of embodiment 500 may include any of the washcoat loadings and precious metal loading of any layers and/or sublayers of layered ECD embodiments 300, 400, and 500, and the washcoat loadings and precious metal loadings of any layers may be combined or altered to merge layers and/or sublayers or repeat layers and/or sublayers if so desired. The inner BMO sublayers 504 through 506 may be layered directly on top of the substrate support 508, as depicted in FIG. 5, while the upper layer 502 may be layered on (top of) the inner BMO layer having a first composition (Base metal oxide composition 1) 504.

Turning now to FIG. 6, another alternative layered ECD embodiment 600 is herein disclosed. Embodiment 600 discloses a layered diesel oxidation catalyst system comprising a first, outer layer 602 configured to trap and oxidize hydrocarbons. In this example, the exemplary first and second layers of FIGS. 3-4 are merged or included one within the other to provide synergistic benefits (similar to layer 502 of FIG. 5). In this first merged layer, exhaust HCs may be trapped, and the trapped exhaust HCs may be oxidized by the first oxidation catalyst to raise an exhaust temperature and periodically generate an exotherm for downstream emission control devices. The combined DOC and HC layer 602, as mentioned above relating to 502, may provide additional benefits of more efficiently trapping and oxidizing HCs and providing increased protection for PGM-BMO sublayers 604 through 606 from HC poisons. The layered system may further include inner PGM-BMO sublayers 604 through 606 which may be configured to include any Pt group metals and/or include any mixtures of base metal oxides. The inner PGM-BMO sublayers may include mixed metal oxides or base metal oxides (BMOs). In an example, the inner PGM-BMO sublayers may include single or mixed base metal oxides in a range of 2 to 75 wt % within the layer. In an example, the inner PGM-BMO sublayers may include single or mixed base metal oxides at 30 wt % within the layer. In one example, the metal oxides may include Mn, Co, W, Mo, Cu Fe, Ce, and Ni. In one example, the metal oxides are salts mixed in an aqueous solution which may be wetted onto zeolite material. In one example, the aqueous BMO salt solution of an innermost PGM-BMO sublayer may be wetted onto zeolite material and then calcined to bond the BMOs to the substrate support. Further, upper PGM-BMO sublayers may be wetted onto inner PGM-BMO sublayers (already calcined) and then calcined in order to achieve the desired order of PGM-BMO sublayers. In one example, the zeolite material may be $ZrO_2$ and the zeolite material may be doped with La and/or Nd in order to increase the stability of the support substrate as well as the overall layered emission control device. The layered system of embodiment 600 may further include a substrate support 608. In one example, substrate support 608 may be the same substrate as disclosed with reference to embodiment 300, element 310, or embodiment 400, element 410, or embodiment 500, element 508.

With reference to FIG. 6, the total washcoat loading may remain in the range of 1.00 to 4.5 $g/in^3$, with different washcoat loading distributions for the different layers, specifically, specifications for washcoat and precious metal loadings of PGM-based DOC layer, HC trap layer, and Base Metal Oxide catalyst layer may be the same as those indicated in FIGS. 4 and 5, and/or any combination of washcoat and precious metal loadings from FIGS. 4 and 5. However, the washcoat loading and precious metal loading between layers may vary. In one example, the washcoat loading of merged layer 602 having the HC oxidation catalyst function (PGM based DOC) and the HC trap function may be 0.25 to 2.5 $g/in^3$. In one example, the washcoat loading of merged layer 602 having the HC oxidation catalyst function (PGM based DOC) and the HC trap function may be 1.0 $g/in^3$. In one example, the washcoat loadings of inner PGM-BMO sublayers 604 through 606 having the BMO catalyst compositions for NOx oxidation and PGM-based DOC may be between 0.25 to 2.5 $g/in^3$. In one example, the washcoat loadings of the layers 604 through 606 having the PGM-BMO catalyst compositions for NOx oxidation may be 1.5 $g/in^3$. The BMO loadings and precious metal loadings of any layers of embodiment 600 may include any of the washcoat loadings and precious metal loading of any layers of embodiment 300, 400, and 500, and the washcoat loadings and precious metal loadings of any layers may be combined or altered to merge layers or repeat layers if so desired. Furthermore, PGM-BMO sublayers 604 through 606 may be configured to comprise any combination of Pt group metals and/or base metal oxides for each individual sublayer. As an example, sublayer 604 may be configured to comprise PGMs and BMOs, while a further sublayer 606 may be configured to comprise only BMOs. Configuring the individual layers 604 through 606 to optionally include one or both of base metal oxides and/or Pt group metals may achieve increased catalytic function, provide more efficient catalysis of NO, CO, HC and/or $SO_2$ species while reducing or maintaining a size of the emissions control device.

The inner BMO layers 604 through 606 may be layered directly on top of the substrate support 608, as depicted in FIG. 6, while the upper layer 602 may be layered on (top of) the inner PGM-BMO layer having a first composition (composition 1) 604. Optionally or additionally, any or all of the inner BMO sublayers 604 through 606 may be incorporated directly into the substrate support 608 in order to reduce or maintain a size of the emissions control system while reducing exhaust emissions.

In each of the embodiments of FIGS. 3-6, the first, outer PGM based DOC layers and/or intermediate layers are configured to load (e.g., trap, adsorb, and the like) a first amount of exhaust hydrocarbons, while the inner, BMO layers are configured to load and oxidize a second amount of exhaust NOx species and potentially trap NOx during a cold start. In one example, the layers may differ in their composition such that the first, outer PGM-based layer may include PGMs while the inner, BMO layer may include a base metal and may or may not include PGMs.

Figure 8:
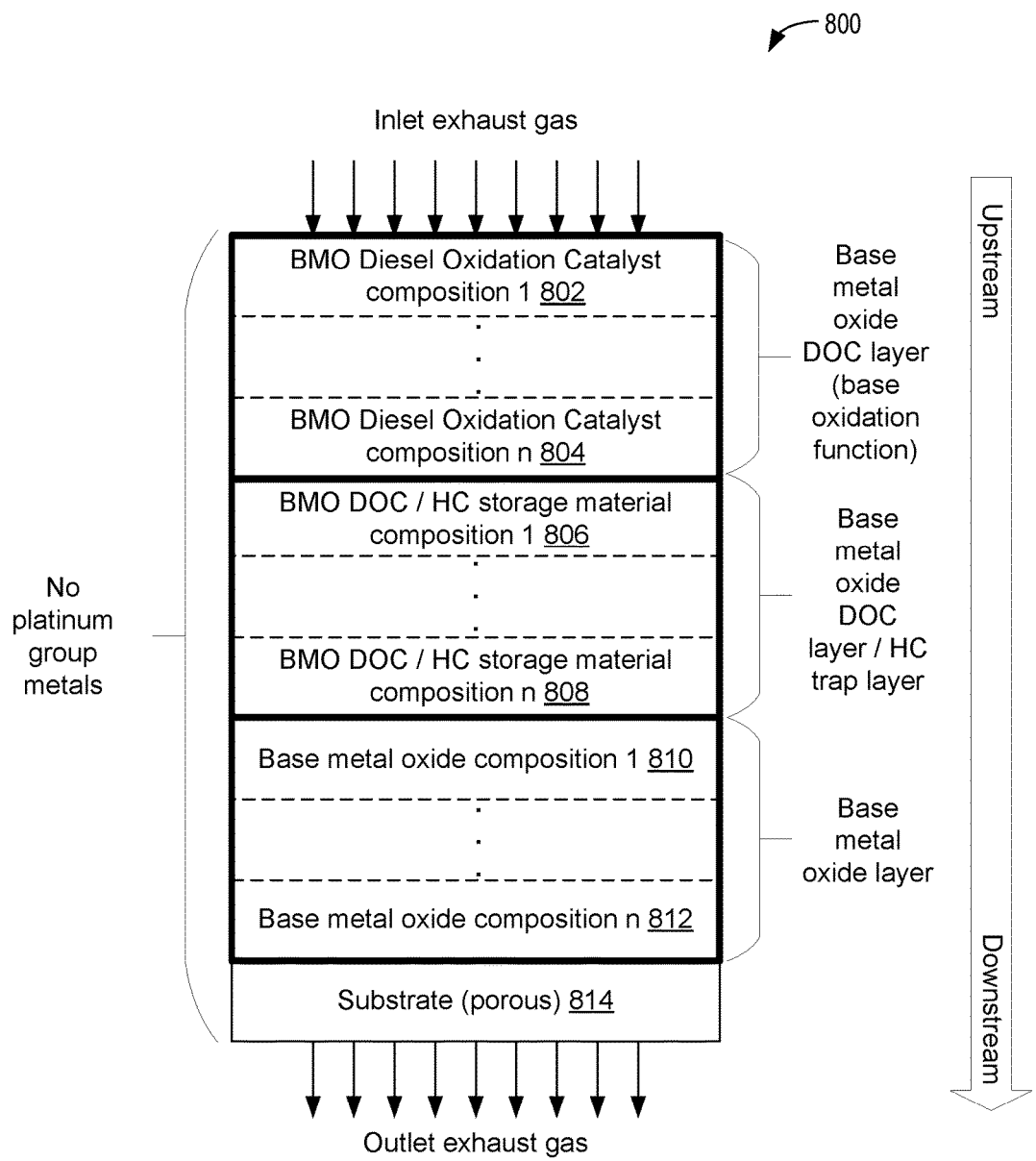
Figure 9:
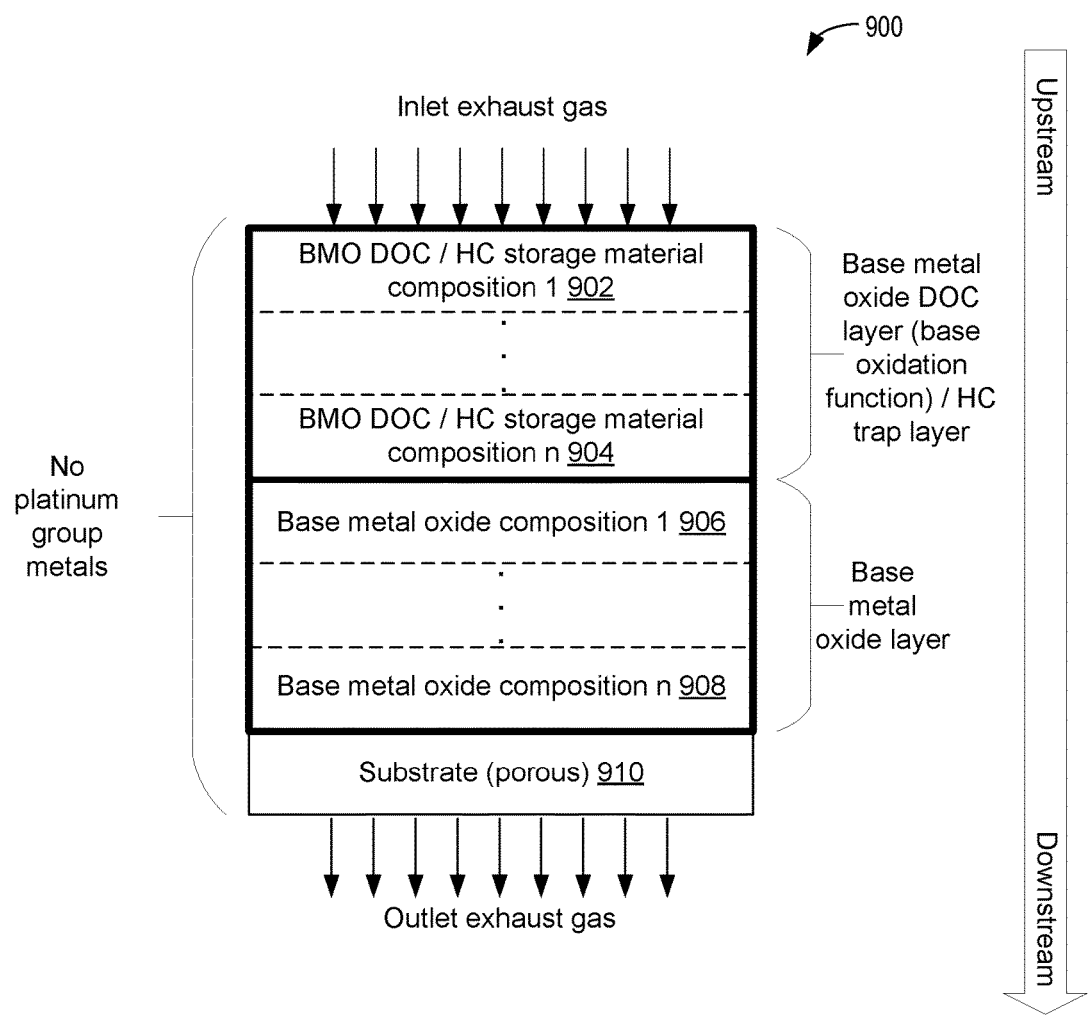

Turning now to FIGS. 7-9, layered DOC device compositions are disclosed which relate to FIGS. 3-6. Exemplary layered ECD embodiments 700, 800, 900, may be analogous to exemplary layered ECD embodiments 300, 400, 500, and 600, however unlike the embodiments disclosed in FIGS. 3-6, the embodiments disclosed in FIGS. 7-9 do not comprise PGMs in the layers and/or sublayers of the layered DOC devices shown in those figures. In some examples, BMO compositions may be shown to provide base oxidation functions (oxidizing HC and CO), thereby precluding a need for PGM-based catalysts.

Exemplary embodiments 700, 800, 900 as they relate to exemplary embodiments 300, 400, 500, and 600 may comprise similar structures wherein the layers comprising PGMs (either wholly or partially) have been replaced with layers comprising BMOs. In some examples, PGM materials may be absent from the catalytic materials and the layered DOC systems may be free of PGM materials in embodiments 700, 800, and 900 In this manner, manufacturing and operating costs may be reduced, as PGM materials are costly in contrast to the base metal oxides disclosed herein. In this way, the ECD manufacturing costs may be reduced, while maintaining and/or lowering engine exhaust emissions.

Turning to FIG. 7, a first embodiment 700 is shown of a layered emission control device, (such as the layered diesel oxidation catalyst system 202 of FIG. 2) coupled downstream from a vehicle exhaust manifold (such as the exhaust manifold 18 of FIG. 1). The layered system may comprise upper (or outer) sublayers 702 through 704 including first, oxidizing base metal oxide catalysts. The first, oxidizing catalyst may be, for example, a base metal oxide catalyst comprising single or mixed base metal oxides. BMO diesel oxidizing catalyst upper sublayer 702 having a first composition (composition 1) may include further include any number (indicated by ellipsis) of additional BMO diesel oxidizing catalyst sublayers having different compositions through 704 (composition n). The first, outer sublayers 702 through 704 may be configured to provide the base catalyst function of oxidizing at least HCs and/or CO and/or $SO_2$. Sublayers 702 through 704 including a range of different BMO diesel oxidation catalysts and compositions may allow for more efficient and HC and CO catalytic function. As an example, there may be between 1 and 10 upper BMO sublayers. As an example, there may be a preferred number of 2 upper BMO sublayers.

The layered emission control device may further comprise an intermediate layer 706 including a hydrocarbon (HC) trap for trapping exhaust HCs. Intermediate layer 706 may be analogous to intermediate layer 304. The layered emission control device may also further comprise a plurality of lower (or inner) sublayers 708 through 710 including different catalytic sublayers which may be base metal oxide (BMO) sublayers having distinct compositions of base metal oxides. There may be any number of inner BMO sublayers as desired (depicted by ellipsis) having different and/or distinct compositions. As an example, the lower, inner sublayers 708 through 710 may comprise NOx oxidation catalysts configured to oxidize exhaust species to $NO_2$ species. The inner BMO layer may further comprise sublayers having different, distinct or repeating compositions compared to the first BMO layer having sublayers 702 through 704. The BMO sublayers 702 through 704 and 708 through 710 may be arranged to exploit certain functional synergies between the different catalytic BMO layers, as described with reference to FIG. 11 below. In some cases, the layered system may further comprise a substrate support 712. The inner BMO layers 708 through 710 may be layered directly on top (e.g., upstream) of the substrate support 712, as depicted in FIG. 7, while the HC storage material 706 may be layered on (e.g., upstream of) the BMO inner layers 708 through 710, and the outer layers 702 through 704 may be layered on (e.g., upstream of) the HC storage layer 706. Additionally any or all of the inner BMO sublayers 708 through 710 may be incorporated directly into the substrate support 712 in order to reduce or maintain a size of the emissions control system while reducing exhaust emissions. As an example, there may be between 1 and 10 inner BMO sublayers. As an example, there may be a preferred number of 2 inner BMO sublayers. As an example, there may be between 1 and 10 outer BMO sublayers. As an example, there may be a preferred number of 2 outer BMO sublayers.

The substrate support 712 of FIG. 7 may be the similar to substrate supports 310, 410, 508, or 608 as described in previous embodiments 300, 400, 500, and 600, and may comprise similar materials and compositions.

The oxidizing catalyst compositions of the inner BMO sublayers 708 through 710 may be configured to trap exhaust species and, optionally or additionally, may be configured to oxidize NOx species in order to provide a stable $NO_2$ source for more downstream Urea-SCR, LNT, or other low temperature NOx adsorbers. The various inner sublayers may be configured with different washcoat loadings. The loadings may be tailored to a specific vehicle application and a specific exhaust emission profile of the engine. In still further embodiments, the washcoat loadings may be adjusted based upon the engine exhaust HC content. The engine exhaust HC content may vary based upon fuel type, engine age, geographic region, climate, or any other factors. In one example, the total washcoat loadings may be in the range of 1.00 to 4.5 $g/in^3$, with different washcoat loading distributions for the different sublayers.

In one example, the washcoat loading of outer BMO diesel oxidation catalyst sublayers 702 through 704 may be 0.25 to 2.5 $g/in^3$. In another example, the washcoat loading of the outer BMO DOC sublayers may be 1.5 $g/in^3$. As platinum-based DOCs have been shown to exhibit degraded NOx oxidation sensitivity under the typical operating conditions of on-road diesel vehicles, it may be more effective to use the layered BMO DOC sublayers as disclosed herein.

The HC storage layer 706 comprising HC storage materials may further include any suitable material such as cordierite, aluminum titanate, aluminum oxide, silicon dioxide, titanium dioxide, cerium dioxide, vanadium oxide, lanthanum oxide, mullite, silicon carbide, zirconium dioxide, baddeleyite, and zeolite material of any appropriate family including aluminosilicates and silicoaluminophosphates (SAPOs). In the embodiment of FIG. 7, the zeolite material of the HC storage material 706 may further include ion-exchanged metal such as Ag, Au, Cu, Fe and/or other metals known to promote HC adsorption. The washcoat loadings of the third, inner BMO sublayers 708 through 710 including the NOx oxidation base metal oxide catalysts may be 0.25 to 2.5 $g/in^3$. In one example, the washcoat loadings of the inner BMO sublayers may be 1.5 $g/in^3$. The inner BMO sublayers 708 through 710 may be configured to include no Pt group metals. The inner BMO sublayers may include mixed metal oxides or base metal oxides (BMOs). In an example, the inner BMO sublayers may include single or mixed base metal oxides in a range of 2 to 75 wt % within the layer. In an example, the inner BMO sublayers may include single or mixed base metal oxides at 30 wt % within the layer. In an example, the washcoat loadings, and/or BMO loadings may be applied to additional BMO sublayers 708 through 710.

In one example, the metal oxides comprising at least the BMO sublayers 708 through 710 may include Mn, Co, W, Mo, Cu Fe, Ce, and Ni. In one example a BMO sublayer comprises a Mn, Cu, W mixture. In one example a BMO sublayer comprises a Mn, Mo, W mixture. In one example a BMO sublayer comprises a Mn, Cu, Ni mixture. In one example a BMO sublayer comprises a Co, Cu, W mixture. In one example a BMO sublayer comprises a Mn, Co, W mixture. In one example a BMO sublayer comprises a Cu, Ni, Fe, W mixture. In one example a BMO sublayer comprises a Mn, Cu, Ce mixture. In one example a BMO sublayer comprises a Co, Ce, Mo mixture. In one example a BMO sublayer comprises a Cu, Ni, Fe, Mo mixture. In one example a BMO sublayer comprises a Mn, Cu, W mixture. In one example a BMO sublayer comprises a Co, Mo, W mixture. In one example a BMO sublayer comprises a Mn, Cu, Ni, Fe mixture. In any of the above mixtures, metals may be exchanged, replaced, added, or removed.

In one example, the outer BMO DOC sublayers and inner BMO sublayers may be prepared via metal salts mixed in an aqueous solution, the metals corresponding to the metals comprising the BMO sublayer metal mixture. The mixed metal salt aqueous solution may be wetted onto zeolite material. In one example, an aqueous BMO salt solution may be wetted onto zeolite material and then calcined to bond the BMOs to the zeolite material. For any of the layered DOC embodiments herein, an innermost BMO salt solution may first be wetted onto the zeolite material, then calcined to bond the innermost BMO sublayer salt composition to the zeolite material. Additionally, further BMO sublayer compositions may be wetted on top of a previously calcined BMO sublayer, in order to calcine one BMO sublayer to another, so as to stack the appropriate BMO sublayers in the desired order to exploit catalytic synergy between the various sublayers while reducing exhaust emissions. In an example, such as embodiment 700 of FIG. 7, where there are two sets of BMO oxidation sublayer compositions (outer compositions 702 through 704 and inner compositions 708 through 710) these may be prepared by using the above-mentioned technique to layer the outer BMO DOC catalyst compositions upon HC storage material 706, and separately, layer inner BMO catalyst compositions upon substrate support 712. After creating these individual stacks of outer and inner BMO stacks, they may be combined in any appropriate way to form the full base metal oxide-only layered catalytic emission control device 700. In one example, the zeolite material may be $ZrO_2$ and the zeolite material may be doped with La and/or Nd in order to increase the stability of the support substrate as well as the overall layered emission control device.

In one example, the layered catalytic device may comprise multiple BMO sublayers comprising distinct BMO compositions, the individual BMO sublayers having different, distinct or repeating compositions illustrated in FIG. 7 as 702 through 704 and 708 through 710. In one example, the multiple sublayers within the BMO layers may be any of the BMO sublayer compositions disclosed above in this disclosure. As an example, the use of multiple BMO sublayers having different, distinct BMO compositions may be useful as different compositions of BMOs may benefit robust oxidation function by providing oxidation function across different ranges of temperatures. As an example, a first BMO sublayer 708 having a first BMO composition may provide robust oxidation during a cold start, the oxidation provided up to a first threshold NOx oxidation temperature. As an example, a second BMO sublayer 710 having a second BMO composition may provide NOx oxidation at a higher temperature, providing oxidation up to a second threshold NOx oxidation temperature. As an example, further BMO sublayers having additional BMO compositions may provide NOx oxidation at further higher temperatures, providing oxidation up to a further threshold NOx oxidation temperatures. Indicated by the ellipsis in FIG. 7, there may be a number of additional BMO sublayers providing increased NOx oxidation at additional temperature ranges. As an example, the outer BMO sublayers 702 through 704 may be configured to oxidize CO, HC, and/or $SO_2$ species while the inner BMO sublayers 708 through 710 may be configured to oxidize NO species.

As an example, the layered ECDs described herein may incorporate the plurality of BMO sublayers of different or repeating compositions, having different or repeating washcoat loadings, with each BMO sublayer of the plurality of BMO sublayers configured to provide increased NOx oxidation within specific temperature ranges, the ranges may or may not be overlapping in order to provide optimal oxidative synergies. Additionally, as an example, each BMO sublayer of the plurality of BMO sublayers may be configured to provide increased NOx oxidation additionally or optionally based upon any ranges and/or configurations relating to the conditions of the exhaust and/or exhaust system and/or engine configurations, such as, optionally or additionally including but not limited to temperature, manifold air pressure, CO exhaust concentrations, HC exhaust concentrations, S exhaust concentrations, PGM concentrations in the layered DOC system, porosities of HC storage materials, exhaust airflow speed, fuel make up, octane rating, cetane number, and/or soot exhaust concentrations.

Turning now to FIG. 8, a layered DOC emissions control device similar to FIG. 7 is provided. As with FIG. 7, FIG. 8 provides an embodiment 800 of a layered DOC device comprising no PGM based catalysts. FIG. 8 differs from the design of embodiment 700 of FIG. 7 wherein the HC storage material layer 708 is replaced by a plurality of BMO DOC sublayers optionally or additionally containing HC storage material, illustrated in FIG. 8 by sublayers 806 through 808. Analogous to the examples disclosed above, BMO DOC sublayers optionally or additionally containing HC storage material 806 through 808 may comprise any number of desired BMO DOC HC storage sublayers, each sublayer of the plurality of sublayers having a composition of base metal oxides and HC trapping materials distinct from other BMO DOC HC storage sublayers. For example, the HC trapping materials of the BMO DOC HC storage sublayers 806 through 808 may have a microporosities (e.g., pore size distributions) that selectively retain exhaust HC species and/or $SO_2$ poisons in the sublayers 806 through 808 thereby reducing the amount of HC and $SO_2$ poisons from entering the downstream BMO sublayers 810 through 812. Furthermore, the pore size distributions of the sublayers 806 through 808 may be configured to enable exhaust NOx species to pass therethrough into the BMO sublayers 810 through 812. Further still, each of the sublayers 806 through 808 may include a distinct pore size distribution different from the other of the sublayers 806 through 808 so that each of the sublayers 806 through 808 may selectively trap differently sized molecular HC and $SO_2$ species. As such, a higher fraction of HC and $SO_2$ species in the exhaust gas may be trapped as compared to conventional emissions control systems. In this way, the second layer including the HC trap may act as a molecular sieve filtering out large molecular weight HCs and $SO_2$ poisons during lean-burn or low temperature conditions and protecting the inner BMO sublayers from the detrimental effects of HC and $SO_2$ adsorption.

As an example, having a plurality of sublayers 806 through 808 may advantageously allow for increased catalyst effectiveness through increased oxidation of hydrocarbons or other carbon species (for example, CO) as well as increased rates of hydrocarbon trapping in order to mitigate HC-poisoning of inner BMO sublayers 810 through 812. Additionally, BMO DOC sublayers 802 through 804 may comprise different base metal oxide compositions than sublayers 806 through 808 as they may be selected in order to oxidize different species from the exhaust stream. As an example, base metal oxide compositions of sublayers 802 through 804 may be selected in order to oxidize one or more of CO, HC, and/or $SO_2$ species. As an example, base metal oxide compositions of sublayers 806 through 808 may be selected in order to oxidize one or more of CO, $SO_2$, and/or HC species. Oxidizing HCs in sublayers 806 through 808 maybe advantageous since the sublayers 806 through 808 also comprise HC storage and/or trapping materials which may allow for more efficient oxidation of HC species. In one example, selecting BMO compositions of sublayers 806 through 808 to be more selective for oxidizing HCs, may allow for selecting the BMO compositions of 802 through 804 to be more selective for oxidizing CO and/or $SO_2$. In this way, emission of CO and $SO_2$ downstream from BMO sublayers 802 through 804 may be reduced, while reducing emission of HC downstream from BMO sublayers 806 through 810, thereby reducing poisoning of BMO catalyst sublayers 810 through 812. The washcoat loadings of the intermediate BMO DOC/HC sublayers 806 through 808 may be 0.5 to 3.0 g/in$^3$. In one example, the washcoat loadings of the intermediate BMO DOC/HC sublayers 806 through 808 may be 1.5 g/in$^3$.

Compositions of inner BMO catalyst sublayers 810 through 812 may be selected to provide increased NOx oxidation and, as such, based upon the composition of the sublayers, they may be effectively poisoned by incoming HC species. As such, upstream, outer sublayers 802 through 804 and intermediate sublayers 806 through 808, downstream of outer sublayers, as mentioned above, may be configured to trap and/or oxidize incoming exhaust species which may poison the inner, downstream sublayers 810 through 812. Such a configuration may allow for a more robust layered DOC emissions control device. Furthermore, outer BMO sublayers 802 through 804 may comprise any of the compositions as disclosed with regards to sublayers 702 through 704 of embodiment 700. Further still, inner BMO sublayers 810 through 812 may be take on any of the compositions as disclosed with regards to sublayers 708 through 710 of embodiment 700. Formation of BMO DOC sublayers 802 through 804 may be analogous to formation of BMO DOC sublayers 702 through 704, formation of inner BMO sublayers 810 through 812 may be analogous to formation of inner BMO sublayers 708 through 710. In one example, the BMO DOC/HC storage sublayers 806 through 808 may be formed by wetting and depositing (e.g., calcining) one or more washcoats on to a porous substrate. In particular, each of the multiple washcoats may correspond to a BMO catalyst composition selected to provide HC (or CO or $SO_2$) oxidation functionality. The washcoats may be deposited on to the porous substrate starting from the most downstream sublayer 808 and ending with the most upstream sublayer 806. In this way, each successive downstream sublayer is deposited before (e.g., more downstream) adjacent more upstream sublayers. Furthermore, the pore size distribution of the carbon or zeolite porous material may be selected to provide HC trapping functionality, as described with respect to the pore size distribution of layers 304 and/or 404. In one example, the porous substrate may include a carbon or zeolite porous material. Washcoat loadings of sublayers 806 through 808 may be similar to washcoat loadings of sublayers 702 through 704.

Turning now to FIG. 9, an embodiment 900 of a layered emissions control device which reduces a number of layers relative to embodiments 700 and 800 is herein disclosed. Outer BMO DOC sublayers additionally containing HC storage material 902 through 904 may comprise any number of desired BMO DOC HC storage sublayers (as indicated by ellipsis), each sublayer of the plurality of sublayers having a composition of base metal oxides and HC trapping materials distinct from other BMO DOC HC storage sublayers. The washcoat loadings of the BMO DOC/HC sublayers 902 through 904 may be 0.25 to 4.5 $g/in^3$. In one example, the washcoat loadings of the BMO DOC/HC sublayers 902 through 904 may be 1.5 $g/in^3$. As an example, advantages of having a plurality of sublayers 902 through 904 may allow for increased rates of oxidation of hydrocarbons and/or other species (for example, CO, $SO_2$) as well as increased HC-trapping rates in order to mitigate poisoning of inner BMO sublayers 906 through 908. For example, the HC trapping materials of the BMO DOC HC storage sublayers 902 through 904 may have a microporosities (e.g., pore size distributions) that selectively retain exhaust HC species and/or $SO_2$ poisons in the sublayers 902 through 904 thereby reducing the amount of HC and $SO_2$ poisons from entering the downstream BMO sublayers 906 through 908. Furthermore, the pore size distributions of the sublayers 902 through 904 may be configured to enable exhaust NOx species to pass therethrough into the BMO sublayers 906 through 908. Further still, each of the sublayers 902 through 904 may include a distinct pore size distribution different from the other of the sublayers 902 through 904 so that each of the sublayers 902 through 904 may selectively trap differently sized molecular HC and $SO_2$ species. As such, a higher fraction of HC and $SO_2$ species in the exhaust gas may be trapped as compared to conventional emissions control systems. In this way, the BMO DOC HC storage sublayers may act as a molecular sieve filtering out large molecular weight HCs and $SO_2$ poisons during lean-burn or low temperature conditions and protecting the inner BMO sublayers from the detrimental effects of HC and $SO_2$ adsorption.

As an example, compositions of outer BMO DOC/HC sublayers 902 through 904 may be selected in order to provide increased oxidation of the above-mentioned species over a range of temperatures and/or over any other ranges of engine operating conditions, such as those disclosed with respect to sublayers 306 through 308 of FIG. 3. For example, each of the BMO DOC/HC sublayers 902 through 904 may have distinct catalyst compositions selected to oxidize one or more species of HCs, CO, and $SO_2$ over a desired temperature range. As such, the pass through amounts of HCs, Co, and $SO_2$ species to the inner BMO sublayers 906 through 908 may be reduced, thereby reducing poisoning of BMO sublayers 906 through 908 while increasing oxidation of NOx species therein and reducing overall exhaust emissions. Inner BMO sublayers 906 through 908 may comprise any number of base metal oxide sublayers having distinct compositions, the compositions selected to provide increased NOx oxidation over a range of temperatures and/or over any other ranges of operating conditions such as those disclosed above with respect to sublayers 306 through 308 of FIG. 3. By providing a layered DOC emissions control device in which the HC storage materials are combined with the BMO DOC layers, increased HC/CO oxidation may be provided since HCs may be trapped within the BMO DOC thereby facilitating oxidation of HCs therein. Furthermore, merging the HC trapping materials with the BMO DOC layers can aid in reducing a size of the ECD since a separate HC storage layer can be averted. Inner BMO sublayers 906 through 908 may comprise any of the compositions as disclosed with regards to sublayers 708 through 710 of embodiment 700.

The embodiments disclosed in FIGS. 3-9 depict the different formulations as different layers and/or sublayers layered on a substrate support, in alternate embodiments, the different formulations may be included on distinct substrates, or bricks. As such, by including different functionalities (e.g. oxidation, trapping, desorption of one or more exhaust species) in each sublayer, a size of the emissions control system may be reduced while reducing exhaust emissions. Optionally or additionally, any of the different layers and/or sublayers disclosed in FIGS. 3-9 may be contained within the substrate support (as opposed to layered on top) so as to reduce a size of the emissions control system and increase HC and NOx oxidation rates.

The inner or outer pluralities of base metal oxide sublayers optionally or additionally including PGMs disclosed in FIGS. 3-9 may comprise compositions of base metal oxides and/or HC storage materials and/or PGMs wherein the compositions are selected to provide increased oxidation of one or more exhaust gas species over a range of temperatures and/or over any other ranges such as those disclosed above with respect to FIG. 3.

It may be a further appreciated herein that the exemplary layered emission control devices of FIGS. 3-9 may indicate the orientation of the layers respective to one another and they may also indicate upstream and downstream layers relative to the flow of exhaust gas over the layered emission control devices. As mentioned above with respect to FIG. 3, as an example, upper layers comprising the diesel oxidation catalyst of FIGS. 3-9 are the furthest upstream and sublayers of upper layers of FIGS. 3-9 located further inward may also be located further downstream of an uppermost DOC sublayer. As an example, intermediate layers of FIGS. 3-9 which may contain HC storage materials may be located further downstream of upper DOC layers. As an example, additional sublayers located further inward, of intermediate HC storage layers, may be located downstream of an uppermost HC storage sublayer. As an example, inner base metal oxide layers of FIGS. 3-9 which may contain base metal oxide compositions for oxidizing NOx species, may be located further downstream of intermediate HC storage layers and upper, DOC layers. As an example, additional sublayers of inner, BMO layers may be further downstream of an uppermost BMO sublayer. As an example, with reference to FIGS. 3-9, the substrate supports may be located furthest downstream of all the layered emissions control device layers, wherein the uppermost DOC layer and/or sublayers are the furthest upstream, the intermediate HC layer and/or sublayers are downstream of the uppermost DOC layer and/or sublayers, the innermost BMO layer and/or sublayers are downstream of the intermediate HC layer and/or sublayers while the uppermost DOC layer and/or sublayers are upstream of the intermediate HC layer and/or sublayers, and the substrate support is, as mentioned above, located furthest downstream with the innermost BMO layer and/or sublayers located upstream of the substrate support, the intermediate HC layer and/or sublayers are upstream of the innermost BMO layer and/or sublayers, and the uppermost DOC layer and/or sublayers are upstream of the intermediate HC layer and/or sublayers.

As an example, the layered emissions control devices disclosed in FIGS. 3-9 may be configured such that they direct the exhaust gas to flow successively through each layer and sublayer of the layered ECD. In one example, the exhaust gas flows successively through each layer of the ECD from an upstream side to a downstream side. In another example, at least a portion of the exhaust gas flows successively through each layer from an upstream side to a downstream side. Flowing the exhaust gas successively through each layer of the DOC aids in achieving at least the advantages of higher oxidation of exhaust species and oxidation of exhaust species over a wide range of temperatures.

When referring to any of the above-mentioned FIGS. 3-9, instances of the use of language referring to "upper" or "outer" layers and/or sublayers may be used to refer to layers and/or sublayers which are positioned more upstream. Furthermore, when referring to any of the above-mentioned FIGS. 3-9, instances of the use of language referring to "lower" or "inner" layers and or/sublayers may be used to refer to layers and/or sublayers which are positioned further downstream. Such language may be utilized because in some instances, the layered emissions control device may be oriented vertically, while in other instances the layered emissions control device may be oriented horizontally, and in other instances the layered emissions control device may be oriented neither horizontally nor vertically. As such, arrows indicating the flow of "inlet exhaust gas" and "outlet exhaust gas" are included with FIGS. 3-9. Additionally, to provide further clarity, further arrows are included adjacent to each of FIGS. 3-9 indicative of relative "upstream" and "downstream" layers of the depicted emissions control devices.

The compositions of the inner BMO layers disclosed within FIGS. 3-9 may also be selected to provide additional oxidation and/or removal of HC and CO. In other words, the inner BMO layers disclosed within FIGS. 3-9 are not limited to only NOx oxidation, and in some cases may further promote HC, CO and $SO_2$ species oxidation.

As an example, any of the abovementioned layers, optionally or additionally comprising a plurality of sublayers, disclosed in FIGS. 3-9 may provide oxidation over a range of temperatures from 100° C. to 800° C.

In one example, to prepare the above mentioned formulations disclosed in FIGS. 3-9, or bricks, a zeolite material is first milled to a desired range. In one example, a zeolite material such as zirconium dioxide may be milled to a distribution range of 80 to 250 micrometers. In some examples, the distribution range may be broader than the range of 80 to 250 micrometers by 40 to 450 micrometers. For example, the distribution range may be from 60 to 270 micrometers. In an example, aqueous solutions of BMO sublayer compositions are prepared by mixing the appropriate metal salts (corresponding to the materials comprising the BMO sublayer) in aqueous solution then wetted onto milled zeolite materials. In some examples, the zeolite material may be one of or a combination of any suitable materials such as cordierite, aluminum titanate, aluminum oxide, silicon dioxide, titanium dioxide, cerium dioxide, vanadium oxide, lanthanum oxide, mullite, silicon carbide, zirconium dioxide, baddeleyite, and zeolite material of any appropriate family including aluminosilicates and silicoaluminophosphates (SAPOs). The mixed zeolite and base metal oxide material may then be dried at a first drying temperature to remove excess moisture. In one example, the first drying temperature may be 90° C. In an example, this process may be repeated multiple times to load higher levels of base metal oxide material or to add other catalytic material, such as additional sublayers. In an example, the dried, mixed zeolite and base metal oxide material may then be calcined to form the layer. In one example, calcination of the dried material may take place at a temperature of 600° C. for 4 hours.

As an example, the layers and/or sublayers of the layered ECDs of FIGS. 3-9 may be positioned or arranged in any suitable combination. The layers and/or sublayers may also be mixed with one another such that one layer and/or sublayer may contain materials designated for separate functions of two different layers and/or sublayer. The layers and/or sublayers of the layered ECD may, in some instances, be repeated, mixed, or combined as mentioned above, so that the layers and/or sublayers of the layered ECD may be arranged and layered onto the support in any suitable arrangement to provide synergistic benefits and reduce emissions while maintaining or reducing a size of the emissions control system and avoiding the competing or interfering functionalities. In this way, the quality of exhaust emissions can be improved relative to conventional emissions control systems by reducing exhaust emissions of HCs, CO, NOx, and SOx species.

As a further example, one or more of the layers may optionally or additionally comprise sublayers having distinct compositions. The distinct sublayers may provide oxidative functionality, trapping, light-off, and/or any other desired functionality, wherein each sublayer provides desired exhaust treatment over a narrower range of engine exhaust conditions (e.g., exhaust temperatures, and the like). Such an arrangement may be effective for providing treatment of exhaust gas over a wide range of engine exhaust conditions and/or additionally may provide increased treatment rates for one or more types of species in the exhaust gas, thereby reducing exhaust emissions while reducing or maintaining a size of the emissions control system.

As a further example, one or more layers may optionally or additionally comprise sublayers having distinct compositions including washcoats which may include PGMs and/or base metal oxides, and the washcoats may include support materials like ceria, zirconia that are stabilized to improve durability.

The layered DOC ECD systems disclosed herein provides a number of advantages. Due to synergistic effects of the PGM and/or BMO mixtures in the various layers and/or sublayers of the layered DOC system, NOx oxidation may be performed within the layered ECD at lower engine operating temperatures, including as low 100° C., with NOx oxidation to $NO_2$ greater than 10% of total NOx engine emissions, but less than 25% oxidation. Furthermore, the layered ECD systems described herein may facilitate engine operating methods for achieving high oxidation conversion rates of NOx engine emissions to $NO_2$ at low and mid-temperature ranges. In one example, peak $NO_2$ formation from oxidation of total NOx engine emissions is achieved in the 300° C.-400° C. range with the layered, integrated DOC compositions described herein with respect to FIGS. 2A, 2B, and 3-9.

Turning now to FIG. 10, an example method 1000 of operating an engine system including a layered emission control device coupled to an engine exhaust manifold is shown. By passing exhaust gas through the layered emission control device before passing the exhaust gas through the other emission control devices, exhaust emissions can be reduced while maintaining or reducing the size of the emissions control system.

At 1002 the method may include passing exhaust gas over a substrate of the layered device (such as the layered emissions control device system or layered DOC) and through a plurality of layers, some layers possibly containing catalytic material for oxidizing HCs, CO, $SO_2$ and/or NOx species and/or some layers containing HC, CO, $SO_2$ and/or NOx traps which may retain HC or NOx and other species. The method further may include passing exhaust gas over a substrate of the layered device and through a plurality of layers, the layers further comprising additional sublayers. The method may further include positioning a first, catalytic layer at an upstream side of the layered device. The method may further include positioning a second, catalytic layer at the downstream side of the layered device. The method may further include interposing a hydrocarbon trapping layer between the first, catalytic layer and the second, catalytic layer, or alternately, positioning the hydrocarbon trapping layer upstream of the second catalytic layer. The method may further include positioning the substrate further downstream of the second, catalytic layer, providing support to the layered device.

Providing support to the layered device may include providing a wettable surface upon which successive washcoats containing BMO and/or PGM catalytic materials may be calcined, thereby forming each of the sublayers and layers of the first catalytic layer, the second catalytic layer, and the hydrocarbon trapping layer. In this way, the positioning of each of the respective layers and/or sublayers may be controlled by first preparing a first aqueous solution comprising the desired composition of the first layer and/or sublayer most downstream (i.e. nearest the substrate support), wetting that first solution onto the support, calcining the first solution onto the support, preparing additional aqueous solutions comprising compositions of additional layers and/or sublayers to be positioned further upstream of the first layer and/or sublayer, wetting additional layers and/or sublayers to be positioned further upstream of the first layer and/or sublayer, and calcining more upstream layers and/or sublayers on top of one another.

As an example, the positioning of layers and/or sublayers as mentioned above may be controlled by selecting adjacent layers with similar coefficients of thermal expansion (CTEs). By selecting adjacent layers and/or sublayers which have similar CTEs, or selecting adjacent layers and/or sublayers wherein a difference between layers' and/or sublayers' CTEs is below a CTE difference threshold, the materials of the calcined layers and/or sublayers in the layered diesel oxidation catalyst may expand and/or contract under transient operating temperatures similarly and maintain adhesion to one another. For example, if the difference between the CTEs of adjacent layers and/or sublayers layers is above the CTE difference threshold, then the materials of the adjacent layers and/or sublayers may not move together and may not maintain adhesion and the layered emissions control device may fail or break.

Furthermore, the catalyst compositions of each layer and/or sublayer may be preselected to provide a distinct catalytic ability for each layer and/or sublayer over a range of engine operating conditions. For example, a first catalyst composition may be preselected for a first sublayer of the second catalytic layer to oxidize NOx within the first sublayer over a first temperature range indicating cold engine start operating conditions, including exhaust temperatures being below a warm engine threshold temperature. The warm engine threshold temperature may correspond to a temperature above which the engine exhaust indicates a warmed-up engine. Similarly, a second catalyst composition (different from the first catalyst composition) may be preselected for a second sublayer of the second catalytic layer to oxidize NOx within the second sublayer over a second temperature range when exhaust temperatures are above a warm engine threshold temperature. Furthermore, a third catalyst composition may be preselected for a third sublayer of the second catalytic layer to trap NOx within the third sublayer over the first temperature range, and to desorb NOx during the second temperature range. The third catalyst composition may advantageously mitigate NOx emissions when the NOx exhaust flows may be higher during cold engine starts by immobilizing NOx within the third layer until an engine warms, and the exhaust temperature increases above the warm engine threshold temperature. Additional different catalyst compositions for each additional sublayer within the second catalytic layer may be preselected to provide NOx oxidation within additional temperature ranges different from the first and second temperature ranges.

Preselecting catalyst compositions may include predetermining, characterizing, and designing catalyst mixtures, such as BMO catalyst mixtures, PGM catalyst mixtures, and catalyst mixtures with both BMO and PGM, in a controlled environment (e.g., laboratory, pilot facility, and the like) to provide the desired oxidation and/or trapping rates in a catalytic layer of a layered ECD. In this way, the layered ECD, including the sublayers of the second catalytic layer, can increase NOx oxidation rates over broader engine operating conditions, thereby reducing exhaust emissions, and maintaining or reducing a size of the emissions control system.

At 1004, the method may include oxidizing a first portion of the exhaust gas at a first, catalytic layer and raising a temperature of the exhaust gas above a threshold temperature. The exhaust gas raised above a threshold temperature may aid in regenerating (e.g., heating) downstream PM filters in the exhaust system, thereby improving the performance of the emission control system. The first portion of the exhaust gas may include one or more of exhaust hydrocarbons, CO, and SOx species. The first catalytic layer may comprise PGMs, including one or more of Pt, Pd, Os, Ir, Ru, and Rh. Of these PGMs, in some examples, the first catalytic layer may comprise only Pt, and Pd. In further examples, of these PGMs, the first catalytic layer may comprise only Pd. In further examples, the first catalytic layer may comprise PGMs without Pt. In other words, the first catalytic layer maybe free of Pt. In another embodiment, the first catalytic layer may include a BMO catalyst. In some examples the first catalytic layer may include a mixture of BMOs comprising at least 2 different BMOs. In other examples, the first catalytic layer may include at least 3 different BMOs, as described previously. Furthermore, the first catalytic layer may include one or more BMOs without PGMs. The first catalytic layer may be formed by washcoating a support material such as a carbon-based or zeolite material.

In some embodiments, the first catalytic layer may include a plurality of sublayers including BMO catalyst materials. As such, each of the sublayers may include a distinct BMO catalyst composition different from the other sublayers. In this way, oxidation of the exhaust gas HCs, CO, and SOx species in the first portion may be increased over a broader range of operating conditions. For example, each catalyst composition may be preselected to selectively oxidize one or more species in the first portion over a narrower range of engine operating conditions, so that a rate of oxidation of the one or more species in the first portion over the narrower range can be increased, as described below with reference to FIG. 11. As such, when taken in combination, the sublayers of the first catalytic layer may increase a total oxidation rate of the first portion over a broader range of operating conditions, thereby reducing exhaust emissions while maintaining or reducing a size of the emissions control system.

At 1006, the method may include retaining a second portion of the exhaust gas, the second portion including exhaust gas hydrocarbons, in a HC storage layer of the device. By retaining the exhaust HCs in the HC storage layer, flow of HCs to a second catalytic layer positioned further downstream may be reduced, thereby mitigating poisoning of the second catalytic layer. In some embodiments, the HC storage layer may be merged with a catalytic layer. Merging the first catalytic layer with the HC storage layer may aid in oxidizing HCs trapped in the HC storage layer. In other words, including catalytic materials in the HC storage layer can facilitate oxidation of HCs since the HCs may be immobilized by the HC storage layer in close proximity to the catalytic material. As such, the efficiency (e.g., rate of HC oxidation per unit mass of catalyst) may be increased so that an amount of catalytic material may be reduced while maintaining or reducing exhaust emissions. In some embodiments, the catalytic material included in the HC storage layer may be PGMs, while in other embodiments, the catalytic material included in the HC storage layer may be BOMs. In some embodiments, the merged HC storage layer and catalytic layer may be separate from the first catalytic layer, as shown in FIGS. 4 and 8. In other embodiments, the merged HC storage layer and catalytic layer may include the first catalytic layer. In some embodiments, the merged HC storage layer and catalytic layer may include a plurality of sublayers, each sublayer including a merged HC storage layer and catalytic layer. As described previously, each of the sublayers may be designed (e.g., by preselecting a catalyst composition and/or pore size distribution thereof) to selectively trap and oxidize one or more species of the first portion therein. Moreover, each of the sublayers may be designed to selectively trap and oxidize one or more species of the first portion therein at a higher rate over a narrower range of engine operating conditions. As such, when taken in combination, the total trapping and oxidation rates of the first portion of exhaust gas over the merged HC storage and catalytic sublayers may be increased, thereby reducing exhaust emissions, while maintaining or reducing a size of the emissions control system. In this way, NOx oxidation in the second catalytic layer may be promoted or increased relative to conventional emissions control systems by including the HC storage layer and/or the first catalytic layer.

At 1008, the method may include oxidizing a third portion of the exhaust gas, including NOx species in a second, catalytic layer different from and positioned downstream from the first catalytic layer. The second catalytic layer may include BMO catalyst material, and may optionally or additionally include catalytic PGM materials. In some embodiments, the second catalytic layer may be free of Pt, since Pt based catalysts can degrade at higher exhaust temperatures, which can cause higher exhaust emissions at higher exhaust temperatures, thereby reducing a catalyst effectiveness. In other embodiments, the second catalytic layer may be free of PGMs since PGMs are more costly relative to BMO catalyst materials, thereby reducing a cost of the layered emissions control system, while reducing exhaust emissions. In one example, the BMO catalyst materials may include at least 2 or at least three BMOs. The second catalytic layer may include a plurality of sublayers, each sublayer including a catalyst composition distinct from the other sublayers.

At 1010, the method may include optimizing NOx oxidation at each sublayer of a plurality of sublayers of the second catalytic layer, wherein each sublayer of the second catalytic layer provides increased NOx oxidation at discrete temperatures over the temperature range. Optimizing the NOx oxidation may refer to increasing a percent oxidation of NOx introduced into the second catalytic layer such that an amount of NOx emissions from the vehicle exhaust is decreased relative to conventional emissions control systems. As described previously, each of the sublayers of the second catalytic layer may be designed (e.g., by preselecting a catalyst composition) to selectively oxidize one or more NOx species of the third portion therein. Moreover, each of the sublayers may be designed to selectively oxidize one or more NOx species of the third portion therein at a higher rate over a narrower range of engine operating conditions. As such, when taken in combination, the total NOx oxidation rates of the third portion of exhaust gas over the sublayers of the second catalytic may be increased, thereby reducing exhaust emissions, while maintaining or reducing a size of the emissions control system. In this way, the NOx oxidation rate may be promoted or increased relative to conventional emissions control systems by including the sublayers of the second catalytic layer. In one example, the entering NOx may be reduced by between 60% and 70% within the second catalytic layer. As an example, an increase in the % oxidation of NOx at the second layer may be due to oxidation of NOx within each sublayer of the second catalytic layer as compared to a single catalyst layer, as in conventional ECDs. Furthermore, as described above, each sublayer of the second catalytic layer may include a catalyst composition distinct from the other sublayers such that total NOx oxidation rates across a broader range of temperatures and other engine operating conditions, as described previously, can be achieved.

At 1012, the method may include passing exhaust gas through and trapping particulate matter in a DPF. In one embodiment, the substrate support of the layered emission control device may include a DPF integrated therein. Optionally or additionally the emissions control system may include a DPF positioned downstream of the substrate, allowing for further downstream particulate capture. Furthermore, having a DPF downstream, separate from the substrate, may allow for more convenient replacement and/or cleaning of a DPF. Optionally or additionally, the DPF may be contained within the substrate support of the layered emission control device, allowing for a size of the layered emission control device to be reduced, and/or allowing for more efficient oxidation of particulate matter at the DPF due to the DPF being closer to the oxidizing catalysts, and thus, closer to the exotherms (heat) generated from oxidation taking place at the oxidizing catalysts which drives the oxidation of particulate matter at the DPF. In other words, integrating the DPF within the substrate support may facilitate easier regeneration of the DPF.

At 1014, the method may include passing exhaust gas downstream from a first layered ECD through one or more of a NOx aftertreatment device such as a NOx trap and SCR catalyst positioned downstream of the layered ECD in the exhaust manifold, as shown in FIG. 2. Optionally or additionally there may be a reducing agent delivery system (such as 208 of FIG. 2) to further reduce NOx emissions. In some embodiments, a second layered ECD may be included further downstream of the NOx aftertreatment device. The second layered ECD may include any combination of the embodiments described herein above with respect to the layered ECD of FIGS. 3-9. The second layered ECD may serve to further lower exhaust emissions by one or more of trapping and oxidizing any HCs, NOx species, CO, or SOx species flowing downstream from the first layered ECD.

Turning now to FIG. 11, examples of increasing catalytic effectiveness by way of a catalytic layer including a plurality of sublayers each comprising a distinct catalytic composition preselected to treat the exhaust gas over a range of temperatures, is shown. Catalyst effectiveness may be described by the extent to which exhaust species are treated (e.g., trapped and/or oxidized) by a catalyst, or catalyst layer or sublayer. The extent to which exhaust species are oxidized by the catalyst may be indicated by a percent oxidation of exhaust species within the catalyst, which may be determined by measuring and comparing exhaust gas conditions immediately upstream and immediately downstream of the catalyst (or catalyst layer or sublayer). The chart illustrates, for example, each catalytic composition of each sublayer, providing oxidation for a percentage of a particular exhaust species, providing said oxidation over a range of temperatures. As an example, such a configuration may be desirable to provide oxidation over a wider range of temperatures (for example, cold starts and/or extra high operating temperatures). As an example, such a configuration may be preferred over conventional catalysts having only one platinum group metal composition, as conventional catalysts will typically only provide oxidation of exhaust species over a single range of temperatures. In contrast, as shown in FIG. 11, the illustrated configuration of multiple sublayers having distinct compositions provides oxidation of exhaust species of multiple ranges of temperatures. Because exhaust gas temperatures can vary widely with engine operating conditions, providing for increased % oxidation over a range of temperatures for different exhaust species by way of including multiple catalyst compositions within a layered ECD may increase overall oxidation of exhaust species such as NOx and hydrocarbons. The plot of FIG. 11 is an example plot of catalyst effectiveness versus temperature. As described above, a layered ECD, including a plurality of sublayers (e.g., upper sublayers, inner sublayers, and/or intermediate sublayers), may provide for increased catalyst effectiveness over broader ranges of engine operating conditions other than exhaust temperature (e.g., MAP, HC exhaust concentration, and the like), as compared to conventional diesel oxidation catalysts.

In the example of FIG. 11, NOx and HC oxidation are illustrated in this figure along with species "n" oxidization illustrating any other species or any other number of other exhaust species which may be oxidized by the layered emissions control device. The catalytic effectiveness of each example composition is illustrated as percent oxidation of the total amount of an exhaust species. % $NO_2$ of total NOx may indicate an amount of exhaust NO oxidized to $NO_2$. As an example, different catalyst compositions may provide increased or decreased oxidation of exhaust species at different temperatures. As an example, certain catalyst compositions may provide oxidation over different ranges of temperatures, or even a plurality of ranges of temperatures (as shown, for example, by 'catalyst composition 1' in the '% Species n oxidized of total n' chart). In the example of FIG. 11, percent oxidation over a range of temperatures for 3 different catalyst compositions is shown, however, in other examples, there may be any number of additional catalyst compositions and the layered emissions control device is not limited in any way to 3 catalyst compositions. Furthermore, the catalyst compositions of FIG. 11, for example, may include catalyst compositions comprising base metal oxides and/or platinum group metals.

Furthermore, FIG. 11 may provide further detail as to the functional synergies described above. As an example, as shown in the "% HC oxidized of total HC" graph, catalyst composition 1 provides a very high percentage of oxidation of total HC exhaust species, relative to other compositions. As an example, catalyst composition 1 may be a PGM-based DOC. In other examples, catalyst composition 1 may be a BMO-based DOC. As an example, catalyst composition 1 may oxidize HCs at a temperature range greater than and less than T1 and may provide oxidation to a greater extent at T1 than within other temperatures within the range.

As a further example, catalyst composition 3 may, as a result, provide a very high percentage of oxidation of total NOx emissions, relative to other compositions. As an example, catalyst composition 3 may be a BMO-based catalyst and/or PGM-based catalyst having a composition providing oxidation of NOx exhaust species within a temperature range greater than and less than T5, and may further provide oxidation to a greater extent at T5 than within the range.

Additionally, as an example catalyst composition 2 may, similarly provide a very high percentage of oxidation of total other species "n" emissions, relative to other compositions. As an example, catalyst composition 2 may be a BMO-based catalyst and/or PGM-based catalyst having a composition providing oxidation of other "n" species within a temperature range greater than and less than T5, and may further provide oxidation to a greater extent at T5 than within the range.

Thus, exhaust gas at a temperature T1 flowing from the engine exhaust manifold to the layered ECD may first encounter a first, upper catalyst layer, including catalyst composition 1, positioned more upstream relative to other catalyst layers of the layered ECD. Exhaust gas hydrocarbons may be more completely oxidized within catalyst layer 1, a higher % HC oxidation occurring within catalyst composition 1 at temperature T1 relative to other catalyst compositions and temperatures. Upon oxidation of the hydrocarbons within the first upper layer, including catalyst composition 1, the exhaust temperature may be raised to T5, due to the exothermic nature of oxidizing HCs. Furthermore, the exhaust gas may continue to flow from the first upper layer to a third, inner layer, including a catalyst composition 3. As shown in FIG. 11, the % $NO_2$ oxidized within catalyst composition 3 is higher at T5 relative to T1. Thus, raising the exhaust temperature from T1 to T5 during HC oxidation in the first upper layer (including catalyst composition 1), may aid in increasing the amount of NOx oxidation relative to other catalyst compositions and temperatures, while increasing HC oxidation, thereby reducing exhaust emissions. In this way, positioning catalyst composition 1 (for HC oxidation therein) upstream of catalyst composition 3 can synergistically increase overall catalyst effectiveness, thereby reducing exhaust emissions from the layered ECD and the emissions control system. As a further example, raising the exhaust temperature from T1 to T5 during HC oxidation may also aid in increasing an amount of species n oxidation in a catalyst layer or sublayer, including catalyst composition 2, positioned downstream from the first upper layer. In one example, the third inner layer may include catalyst composition 2 within a sublayer in addition to catalyst composition 3 within a different sublayer.

Figure 12:
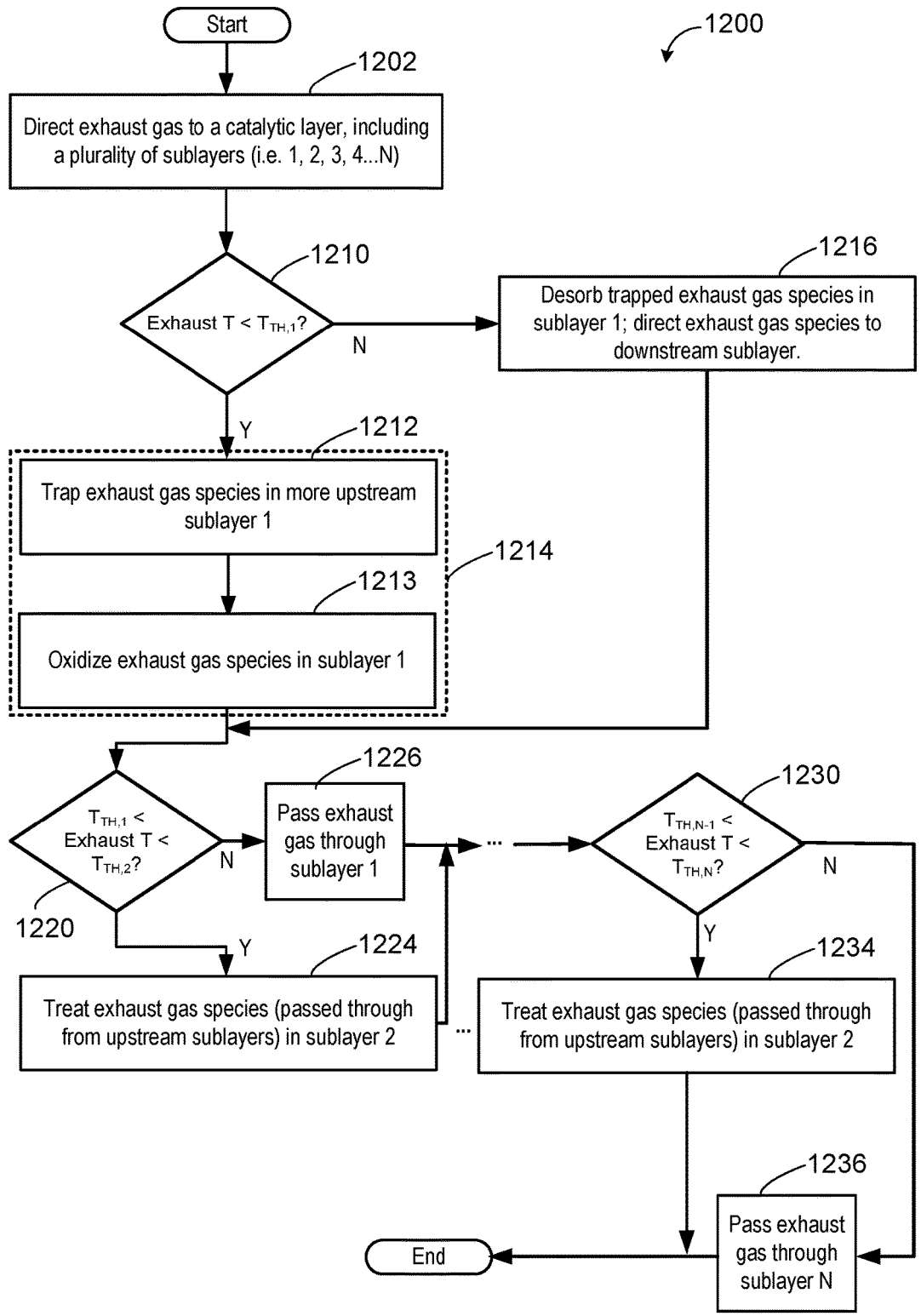

Turning now to FIG. 12, it illustrates a flow chart for a method 1200 of increasing catalyst effectiveness by way of a layered ECD with a catalytic layer including a plurality of sublayers, each sublayer having a distinct catalyst composition from the other sublayers. As described above, example catalytic layers having a plurality of sublayers (e.g., N sublayers) may include BMO layers of FIGS. 3-5 and 7-9; PGM/BMO layer of FIG. 6; BMO DOC layers of FIGS. 7 and 8; and BMO DOC/HC trap layers of FIGS. 8 and 9. The catalyst effectiveness may be increased by increasing a treatment rate of the exhaust gas as it passes through the catalytic layers. Treatment may refer to one or more of trapping, desorbing, and oxidizing one or multiple species (e.g., HCs, NOx, CO, SOx, PM) in the exhaust gas. For example, treatment may refer to one or more of HC oxidation, HC trapping, NOx trapping, NOx oxidation, CO oxidation, SOx trapping, PM oxidation. The steps of method 12 may be executed as part of any one or more of the treatment steps included in method 1000, while exhaust gas is directed to and treated within a catalytic layer including a plurality of sublayers.

Method 1200 illustrates an example method of increasing catalyst effectiveness over a broad temperature range, wherein each sublayer catalyst composition is preselected to provide an increased exhaust gas treatment rate over a narrower temperature range, relative to the treatment rate provided by a conventional catalyst over the narrower temperature range. Taken together, the combination of sublayers are able to provide exhaust gas treatment over multiple narrower temperature ranges, the multiple narrower temperature ranges overlapping and combining to encompass a broader overall temperature range. Accordingly, when exhaust gas is directed successively over the combination of sublayers within the catalytic layer, increased exhaust gas treatment rates over a broader temperature range are provided. Although method 1200 describes increasing catalyst effectiveness over a broad temperature range, the sublayer catalyst compositions may additionally or alternately be preselected to provide increased exhaust gas treatment rates over broad ranges of exhaust operating conditions other than exhaust temperature, including MAP, CO exhaust concentration, HC exhaust concentrations, S exhaust concentrations, PGM concentrations in the layered DOC system, porosities of HC storage materials, exhaust airflow speed, fuel make up, octane rating, cetane number, and/or soot exhaust concentrations, and the like. In other words one or more of the temperature-based decisions of method 1200 at 1210, 1220, and 1230 may be substituted by other exhaust operation condition-based decisions (wherein the corresponding threshold temperatures $T_{TH,N-1}$ and $T_{TH,N}$ may be replaced by other threshold exhaust operating conditions corresponding to the (N−1)th and Nth sublayers). As such, one or more of the sublayers may have a catalyst composition preselected to provide increased exhaust treatment rates over a narrower range of MAP (or another exhaust operating conditions), for example. Such catalyst composition preselection may enable more effective emissions controls for one or more layered emissions control devices comprising an aftertreatment device.

Method 1200 begins at 1202 where the exhaust gas emitted from an engine is directed to the catalytic layer including a plurality of sublayers (1, 2, 3, 4 . . . N). Next at 1210, method 1200 determines if the exhaust temperature is less than a first threshold temperature, $T_{TH,1}$. $T_{TH,1}$ may correspond to a temperature below which the exhaust gas treatment rate within sublayer 1 is increased relative to other sublayers. For example, $T_{TH,1}$ may correspond to a temperature below which a cold engine start is indicated. Sublayer 1 may be positioned more upstream than the other sublayers 2, 3, N, and may refer to one or more sublayers at an upstream side of the catalytic layer. For the case where the temperature is less than $T_{TH,1}$, one or more exhaust gas species may be treated in sublayer 1 at 1214. In other words, the catalyst composition of sublayer 1 may be preselected to treat the one or more exhaust gas species at increased rates when the exhaust temperature is less than $T_{TH,1}$. Treating the one or more exhaust gas species may include trapping and/or oxidizing the exhaust gas species at 1212 and 1213, respectively. For the case of NOx treatment, when exhaust temperature is less than $T_{TH,1}$, NOx may be trapped in sublayer 1 since NOx oxidation rates may be very low at lower temperatures. In this way, trapping NOx in sublayer 1 may mitigate passing of NOx through the catalytic layer untreated, thereby reducing NOx emissions. Furthermore, a catalyst composition of sublayer 1 may be selected to provide higher NOx oxidation rates at temperatures below $T_{TH,1}$ as compared to conventional catalysts. Conventional catalysts may exhibit lower NOx oxidation rates during cold engine startup because they are generally tailored to providing increased oxidation rates at more prevalent engine operating conditions, such as at warm engine exhaust temperatures. In this way, the catalytic layer, including sublayer 1 may increase NOx oxidation over a narrower temperature range, such as during cold engine starts (e.g., when exhaust temperature<$T_{TH,1}$). Returning to 1210 for the case where the exhaust temperature is greater than $T_{TH,1}$, method 1200 continues at 1216 by directing the exhaust gas species to downstream sublayers. Directing the exhaust gas species to downstream sublayers may include desorbing any trapped exhaust gas species in sublayer one.

Next, method 1200 continues from 1214 and 1216 at 1220 where it determines if $T_{TH,1}$<exhaust temperature<$T_{TH,2}$. $T_{TH,2}$ may refer to a second threshold temperature greater than the first threshold temperature. For the case where the exhaust temperature is between $T_{TH,1}$ and $T_{TH,2}$, method 1200 continues to 1224 where one or more of the exhaust gas species passed through from upstream sublayers (e.g., upstream from sublayer 2) are treated in sublayer 2. Sublayer 2 may be positioned downstream from sublayer 1, and more upstream than other sublayers 3, 4, N, and may refer to one or more sublayers. The catalyst composition of sublayer 2 may be preselected to treat the one or more exhaust gas species at increased rates $T_{TH,1}$<exhaust temperature<$T_{TH,2}$. For the case of NOx oxidation, the catalyst composition of sublayer 2 (which may refer to one or more sublayers) may be preselected to provide an increased NOx oxidation rate when $T_{TH,1}$<exhaust temperature<$T_{TH,2}$. In contrast, the NOx oxidation rate in sublayer 2 may be very low when the exhaust temperature is<T<$T_{TH,1}$ or when the exhaust temperature is>$T_{TH,2}$. Accordingly, returning to 1220 for the case where the exhaust temperature is<$T_{TH,1}$ or when the exhaust temperature is>$T_{TH,2}$, exhaust gas may be passed through the sublayer 2 at 1226, being minimally treated or untreated. In this way, the catalytic layer, including sublayer 2 may increase NOx oxidation over a narrower temperature range between $T_{TH,1}$ and $T_{TH,2}$.

Next, method 1200 continues by repeating analogous steps to steps 1220-1226 for the nth sublayer, where n is a positive integer from 1 to N. In particular, method 1200 continues from 1224 and 1226 at 1230 where it determines if $T_{TH,n-1}$<exhaust temperature<$T_{TH,n}$. $T_{TH,n}$ may refer to an nth threshold temperature greater than the (n-1)th threshold temperature. For the case where the exhaust temperature is between $T_{TH,n-1}$ and $T_{TH,n}$, method 1200 continues to 1234 where one or more of the exhaust gas species passed through from upstream (e.g., upstream from sublayer n) sublayers from sublayer n are treated in sublayer n. Sublayer n may be positioned downstream from sublayer n−1, and more upstream than other sublayers n+1, n+2, . . . N, and may refer to one or more sublayers. The catalyst composition of sublayer n may be preselected to treat the one or more exhaust gas species at increased rates $T_{TH,n-1}$<exhaust temperature<$T_{TH,n}$. For the case of NOx oxidation, the catalyst composition of sublayer n (which may refer to one or more sublayers) may be preselected to provide an increased NOx oxidation rate when $T_{TH,n-1}$<exhaust temperature<$T_{TH,n}$. In contrast, the NOx oxidation rate in sublayer n may be very low when the exhaust temperature is<$T_{TH,n-1}$ or when the exhaust temperature is>$T_{TH,n}$. Accordingly, returning to 1230 for the case where the exhaust temperature is<$T_{TH,n-1}$ or when the exhaust temperature is>$T_{TH,n}$, exhaust gas may be passed through the sublayer n at 1236, being minimally treated or untreated. In this way, the catalytic layer, including sublayer n may increase NOx oxidation over a narrower temperature range between $T_{TH,n-1}$ and $T_{TH,n}$. After 1236, method 1200 ends.

As another example, a layered emission control device (ECD) coupled to an engine exhaust, is provided, comprising: a first layer including a first oxidizing catalyst; a second layer including a hydrocarbon trap upstream from a third layer; and the third layer, comprising inner sublayers, each of the inner sublayers comprising base metal oxide (BMO) catalysts and having a BMO catalyst composition distinct from the other inner sublayers, wherein exhaust gas is directed into and emitted from the layered ECD at an upstream side of the first layer and at a downstream side of the third layer, respectively. In the preceding example, additionally or optionally, each of the inner sublayers include 30 weight % BMOs. In any or all of the preceding examples, the third layer is free of platinum. In any or all of the preceding examples, the BMO catalysts are incorporated into the inner sublayers by way of inner washcoats calcined over a porous substrate, each of the inner sublayers comprising one of the inner washcoats at a washcoat loading between 0.25 and 5 g/in³. In any or all of the preceding examples, the BMO catalysts are incorporated into the inner sublayers as inner washcoats, each of the inner sublayers including one of the inner washcoat calcined over a porous substrate, each of the inner sublayers comprising at least three different base metals. In any or all of the preceding examples, the porous substrate is positioned downstream from the third layer, the porous substrate having a higher porosity than the first layer, the second layer, and the third layer. In any or all of the preceding examples, the porous substrate includes a zeolite material doped with La and/or Nd. In any or all of the preceding examples, the porous substrate includes a diesel particulate filter. In any or all of the preceding examples, the second layer is integrated with the first layer, the first layer comprising an upper washcoat including the first oxidizing catalyst calcined on to the second layer, one or more hydrocarbon species of the exhaust gas are oxidized at the surface of the first oxidizing catalyst, and the hydrocarbon trap includes a molecular sieve having a pore size distribution whereby the one or more hydrocarbon species of the exhaust gas are retained in the hydrocarbon trap. In any or all of the preceding examples, they layered ECD may additionally or optionally include a total washcoat loading of 1 to 4.5 g/in3, the total washcoat loading including a first washcoat including the first oxidizing catalyst, and a plurality of inner washcoats, each of the inner washcoats comprising one of the BMO catalyst compositions of the inner sublayers.

As another example, an emissions control system fluidly coupled to an engine exhaust is included, comprising: a first oxidizing catalyst layer positioned at an upstream side of the system within which a first portion of the exhaust gas is oxidized; a second oxidizing catalyst layer arranged at a downstream side of the system within which a second portion of the exhaust gas is oxidized; and a hydrocarbon trapping layer arranged intermediate to upstream side and the downstream side, wherein the second oxidizing catalyst layer comprises a plurality of second sublayers, each of the second sublayers comprise base metal oxide (BMO) catalysts, each of the second sublayers having a BMO catalyst composition distinct from the other second sublayers, and the first portion of the exhaust gas comprises one or more of hydrocarbons, CO, and $SO_2$, and the second portion of the exhaust gas comprises NOx. In any or all of the preceding examples, a rate of NOx oxidation in each of the second sublayers peaks at a different threshold temperature, each of the different threshold temperatures corresponding to the BMO catalyst composition of one of the second sublayers. In any or all of the preceding examples, the first oxidizing layer comprises base metal oxides (BMOs) without platinum group metals (PGMs). In any or all of the preceding examples, the layered emission control system is free of PGMs. In any or all of the preceding examples, the first oxidizing catalyst layer comprises a plurality of first sublayers, each of the first sublayers including an oxidizing catalyst composition distinct from the other first sublayers. In any or all of the preceding examples, each of the first sublayers comprises at least three different base metal oxides. In any or all of the preceding examples, the emissions control system may additionally or optionally include a NOx aftertreatment device positioned in the engine exhaust downstream from the layered ECD, and a second layered ECD positioned downstream from the NOx aftertreatment device.

As another example, a method of treating exhaust gas from an engine is included, the engine including a layered emissions control device (ECD), comprising: directing the exhaust gas at an inlet temperature to a first layer of the layered ECD positioned at an upstream side of the layered ECD, the first layer comprising a first oxidizing catalyst; oxidizing a first portion of the exhaust gas by the first oxidizing catalyst within the first layer; trapping a second portion of the exhaust gas within a second layer, the second layer including a hydrocarbon trapping material; directing the exhaust gas from the first and second layers to a third layer, the third layer including a plurality of inner sublayers, each of the sublayers comprising base metal oxide (BMO) catalysts and having a BMO catalyst composition distinct from the other inner sublayers; and oxidizing a third portion of the exhaust gas in the third layer, wherein the first portion comprises one or more of hydrocarbons, CO, and $SO_2$, the second portion comprises hydrocarbons, and the third portion comprises NOx. In any or all of the preceding examples, the method may additionally or optionally include trapping without oxidizing the third portion in the third layer while an exhaust temperature is below a warm engine threshold temperature, and desorbing and oxidizing the trapped third portion in the third layer when the exhaust temperature rises above the warm engine threshold temperature. In any or all of the preceding examples, the method may additionally or optionally include oxidizing the third portion in one of the inner sublayers only while an exhaust temperature is below a first threshold temperature, and oxidizing the third portion in another of the inner sublayers only while the exhaust temperature is above the first threshold temperature.

In this way, various emission control functions and formulations may be layered on a substrate support to integrate the various emission control functions within the packaging volume constraints of a vehicle engine exhaust manifold. By organizing the configuration of the layers to increased synergistic benefits while reducing functional interference, the quality of exhaust emissions may be improved by reducing emissions of HCs, NOx, and SOx species.

It will be appreciated that the configurations and process flows disclosed herein are exemplary in nature, and that these specific embodiments are not to be considered in a limiting sense, because numerous variations are possible.

The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combination and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A layered emission control device (ECD) coupled to an engine exhaust, comprising:
 a first layer including a first oxidizing catalyst;
 a second layer including a hydrocarbon trap upstream from a third layer; and
 the third layer, comprising inner sublayers, each of the inner sublayers comprising base metal oxide (BMO) catalysts and having a BMO catalyst composition distinct from the other inner sublayers, wherein a rate of NOx oxidation in each of the inner sublayers peaks at a different threshold temperature, and wherein exhaust gas is directed into and emitted from the layered ECD at an upstream side of the first layer and at a downstream side of the third layer, respectively.

2. The layered ECD of claim 1, wherein each of the inner sublayers include 30 weight % BMOs.

3. The layered ECD of claim 2, wherein the third layer is free of platinum.

4. The layered ECD of claim 2, wherein the BMO catalysts are incorporated into the inner sublayers by way of inner washcoats calcined over a porous substrate, each of the inner sublayers comprising one of the inner washcoats at a washcoat loading between 0.25 and 5 g/in3.

5. The layered ECD of claim 1, wherein the BMO catalysts are incorporated into the inner sublayers as inner washcoats, each of the inner sublayers including one of the inner washcoat calcined over a porous substrate, each of the inner sublayers comprising at least three different base metals.

6. The layered ECD of claim 5, wherein the porous substrate is positioned downstream from the third layer, the porous substrate having a higher porosity than the first layer, the second layer, and the third layer.

7. The layered ECD of claim 6, wherein the porous substrate includes a zeolite material doped with La and/or Nd.

8. The layered ECD of claim 6, wherein the porous substrate includes a diesel particulate filter.

9. The layered ECD of claim 1, wherein
 the second layer is integrated with the first layer, the first layer comprising an upper washcoat including the first oxidizing catalyst calcined on to the second layer,
 one or more hydrocarbon species of the exhaust gas are oxidized at a surface of the first oxidizing catalyst, and
 the hydrocarbon trap includes a molecular sieve having a pore size distribution whereby the one or more hydrocarbon species of the exhaust gas are retained in the hydrocarbon trap.

10. The layered ECD of claim 1, further comprising a total washcoat loading of 0.1 to 9.0 g/in3, the total washcoat loading including a first washcoat including the first oxidizing catalyst, and a plurality of inner washcoats, each of the inner washcoats comprising one of the BMO catalyst compositions of the inner sublayers.

11. An emissions control system fluidly coupled to an engine exhaust, comprising:
 a first oxidizing catalyst layer positioned at an upstream side of the system within which a first portion of exhaust gas is oxidized;
 a second oxidizing catalyst layer arranged at a downstream side of the system within which a second portion of the exhaust gas is oxidized; and
 a hydrocarbon trapping layer arranged intermediate to the upstream side and the downstream side, wherein
 the second oxidizing catalyst layer comprises a plurality of second sublayers, each of the second sublayers comprises base metal oxide (BMO) catalysts, each of the second sublayers having a BMO catalyst composition distinct from the other second sublayers, wherein a rate of NOx oxidation in each of the second sublayers peaks at a different threshold temperature, and
 the first portion of the exhaust gas comprises one or more of hydrocarbons, CO, and $SO_2$, and the second portion of the exhaust gas comprises NOx.

12. The emissions control system of claim 11, wherein each of the different threshold temperatures correspond to the BMO catalyst composition of one of the second sublayers.

13. The emissions control system of claim 11, wherein the first oxidizing layer comprises base metal oxides (BMOs) without platinum group metals (PGMs).

14. The emissions control system of claim 13, wherein the layered emission control system is free of PGMs.

15. The emissions control system of claim 11, wherein the first oxidizing catalyst layer comprises a plurality of first sublayers, each of the first sublayers including an oxidizing catalyst composition distinct from the other first sublayers.

16. The emissions control system of claim 15, wherein each of the first sublayers comprises at least three different base metal oxides.

17. The emissions control system of claim 11, further comprising a NOx aftertreatment device positioned in the engine exhaust downstream from a layered emissions control device (ECD), and a second layered ECD positioned downstream from the NOx aftertreatment device.

18. A method of treating exhaust gas from an engine, the engine including a layered emissions control device (ECD), comprising:
- directing the exhaust gas at an inlet temperature to a first layer of the layered ECD positioned at an upstream side of the layered ECD, the first layer comprising a first oxidizing catalyst;
- oxidizing a first portion of the exhaust gas by the first oxidizing catalyst within the first layer;
- trapping a second portion of the exhaust gas within a second layer, the second layer including a hydrocarbon trapping material;
- directing the exhaust gas from the first and second layers to a third layer, the third layer including a plurality of inner sublayers, each of the sublayers comprising base metal oxide (BMO) catalysts and having a BMO catalyst composition distinct from the other inner sublayers wherein a rate of NOx oxidation in each of the inner sublayers peaks at a different threshold temperature; and
- oxidizing a third portion of the exhaust gas in the third layer, wherein the first portion comprises one or more of hydrocarbons, CO, and $SO_2$, the second portion comprises hydrocarbons, and the third portion comprises NOx.

19. The method of claim 18, further comprising trapping without oxidizing the third portion in the third layer while an exhaust temperature is below a warm engine threshold temperature, and desorbing and oxidizing the trapped third portion in the third layer when the exhaust temperature rises above the warm engine threshold temperature.

20. The method of claim 18, further comprising oxidizing the third portion in one of the inner sublayers only while an exhaust temperature is below a first threshold temperature, and oxidizing the third portion in another of the inner sublayers only while the exhaust temperature is above the first threshold temperature.

* * * * *